United States Patent [19]
Usui

[11] Patent Number: 5,995,297
[45] Date of Patent: Nov. 30, 1999

[54] ZOOM LENS

[75] Inventor: Fumiaki Usui, Utsunomiya, Japan

[73] Assignee: Canon Kabushiki Kaisha, Tokyo, Japan

[21] Appl. No.: 09/118,904

[22] Filed: Jul. 20, 1998

[30] Foreign Application Priority Data

Jul. 24, 1997 [JP] Japan ................................. 9-198343

[51] Int. Cl.$^6$ .................................................. G20B 15/14
[52] U.S. Cl. ........................ 359/684; 359/685; 359/686; 359/687; 359/688; 359/569; 359/570
[58] Field of Search .................................. 359/685, 676, 359/683, 684, 686, 687, 688, 569–570

[56] References Cited

U.S. PATENT DOCUMENTS

| | | | |
|---|---|---|---|
| 4,281,906 | 8/1981 | Tanaka | 350/427 |
| 5,579,172 | 11/1996 | Aoki et al. | 359/688 |
| 5,583,698 | 12/1996 | Yamada et al. | 359/687 |
| 5,583,700 | 12/1996 | Usui et al. | 359/688 |
| 5,737,128 | 4/1998 | Usui | 359/686 |
| 5,745,300 | 4/1998 | Usui et al. | 359/684 |
| 5,760,969 | 6/1998 | Suzuki | 359/688 |
| 5,831,771 | 11/1998 | Suzuki | 359/689 |

FOREIGN PATENT DOCUMENTS 54-127322 10/1979 Japan .
7-035978 2/1995 Japan .

*Primary Examiner*—Georgia Epps
*Assistant Examiner*—David Spector
*Attorney, Agent, or Firm*—Fitzpatrick, Cella, Harper & Scinto

[57] ABSTRACT

This specification discloses a zoom lens which has, in succession from the object side, a first lens unit of positive refractive power, a second lens unit having negative refractive power and movable during a focal length change, a third lens unit for correcting the changing of an image plane resulting from the movement of the second lens unit, and a fixed fourth lens unit having positive refractive power, and in which an aspherical surface of a predetermined shape for correcting well spherical aberration and distortion resulting from a focal length change is provided on a predetermined lens surface in the first lens unit.

8 Claims, 34 Drawing Sheets

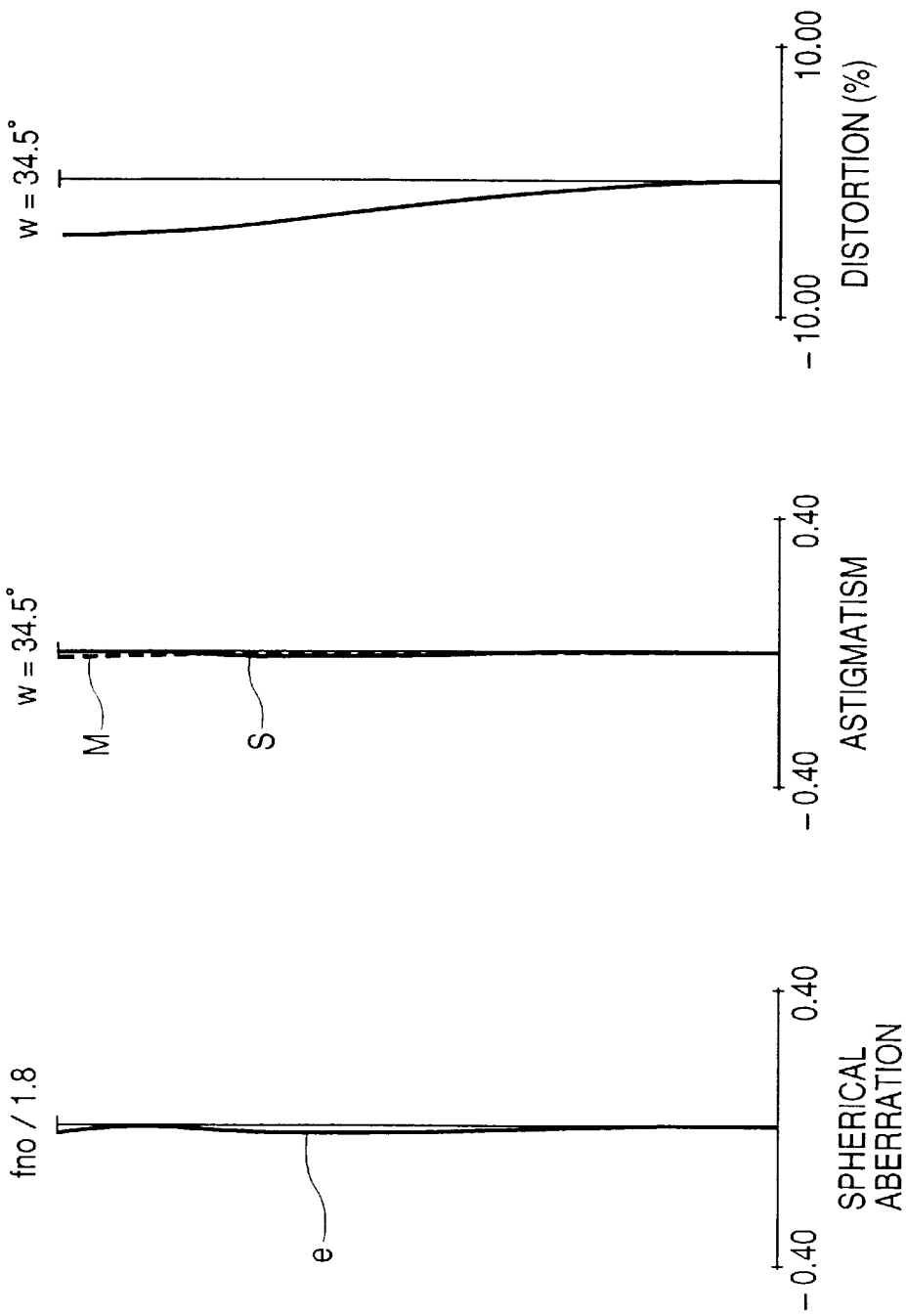

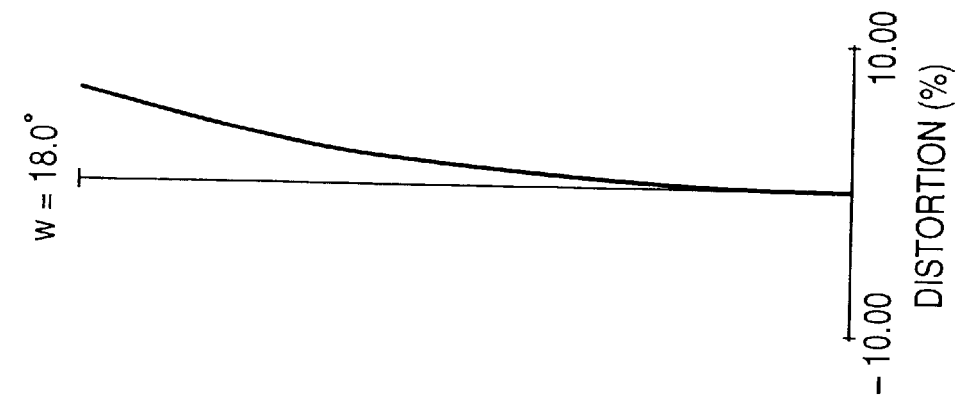
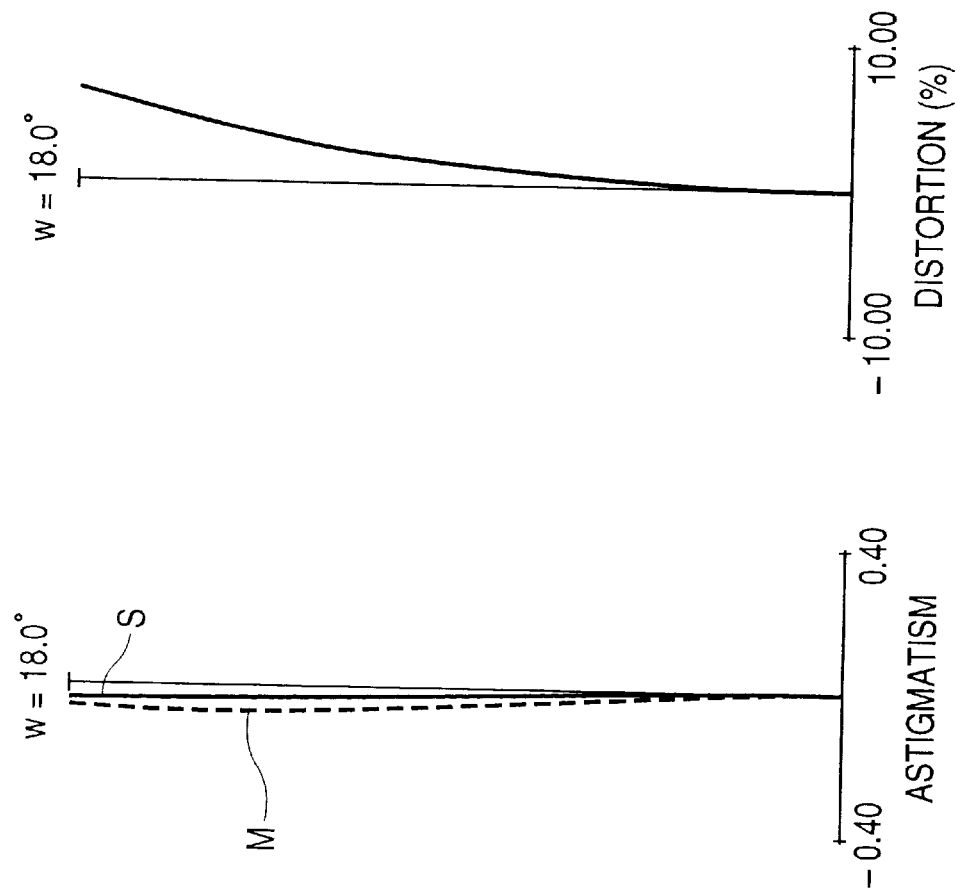
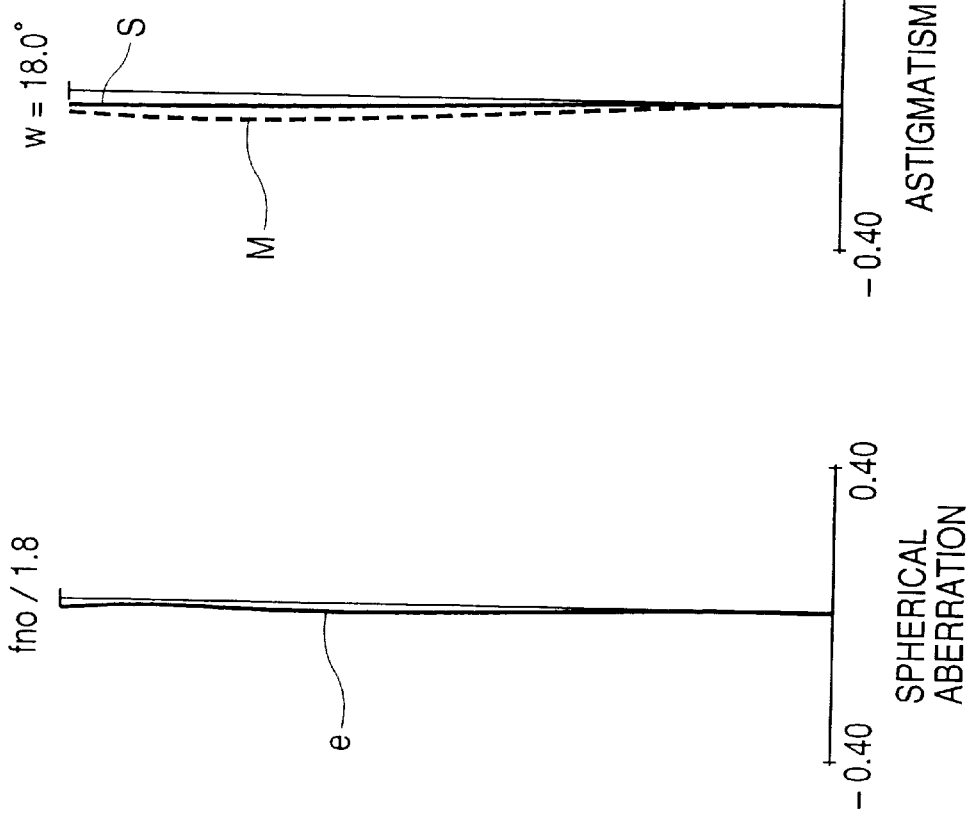

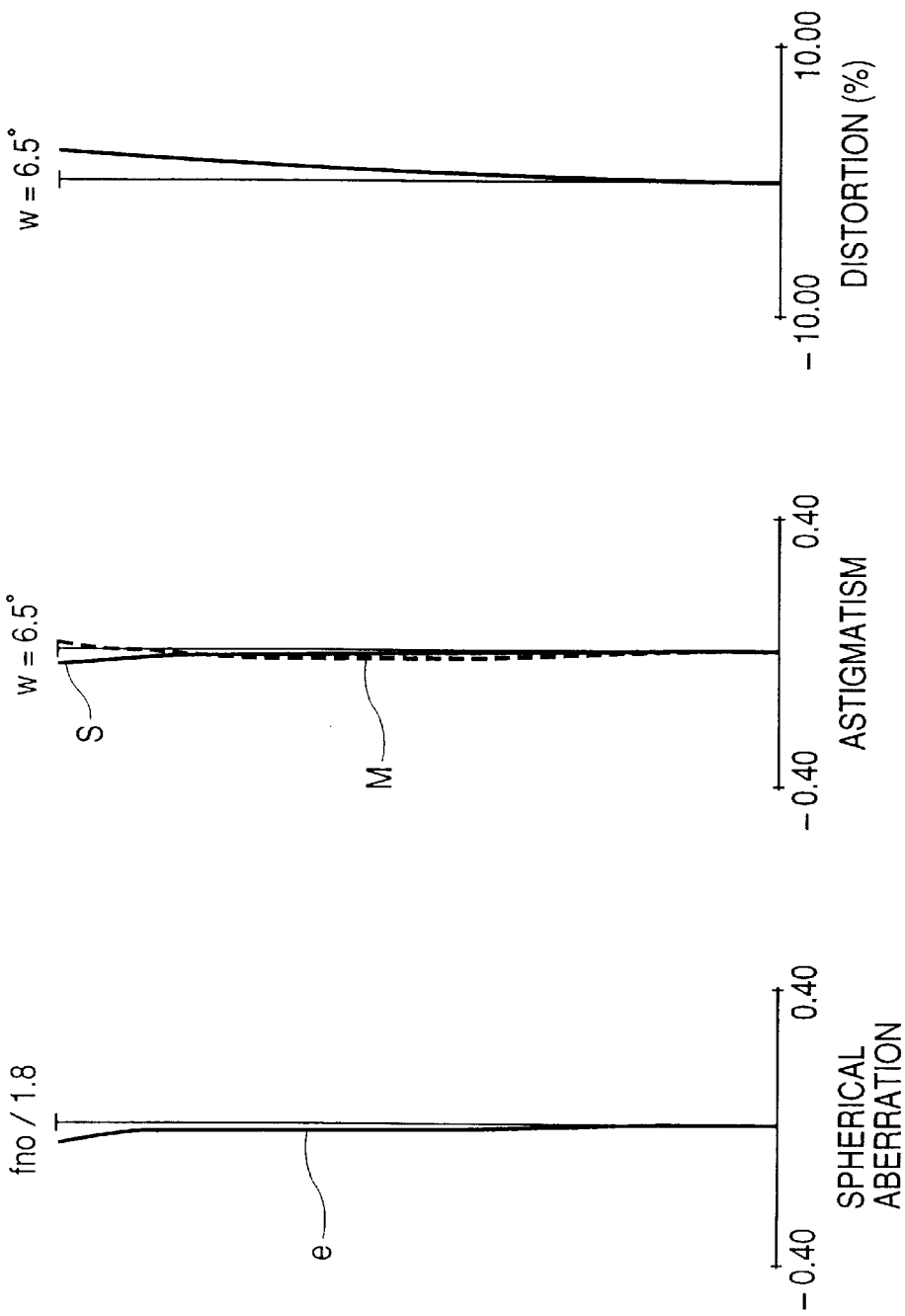

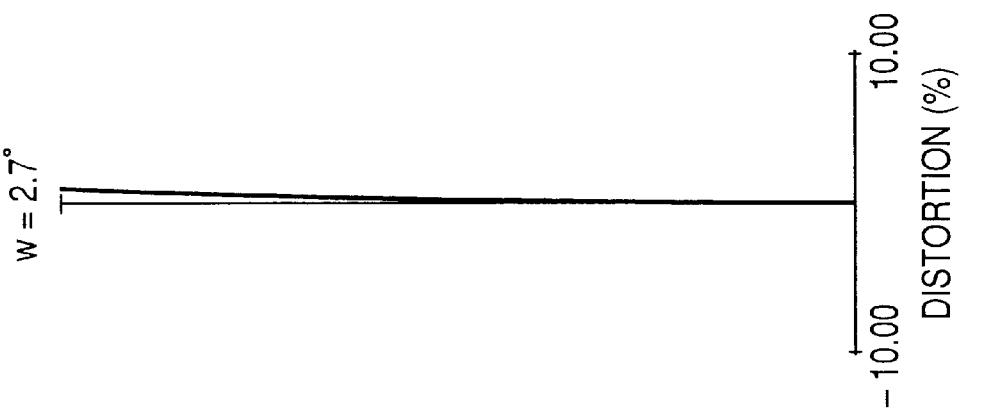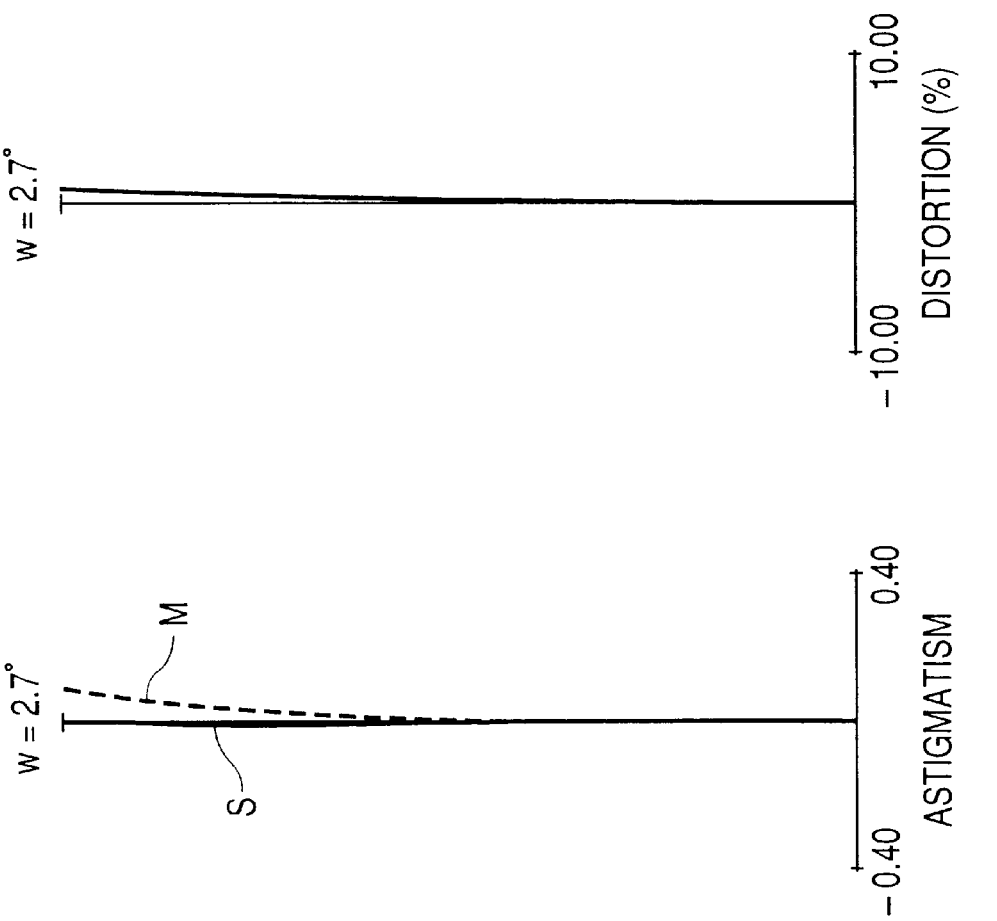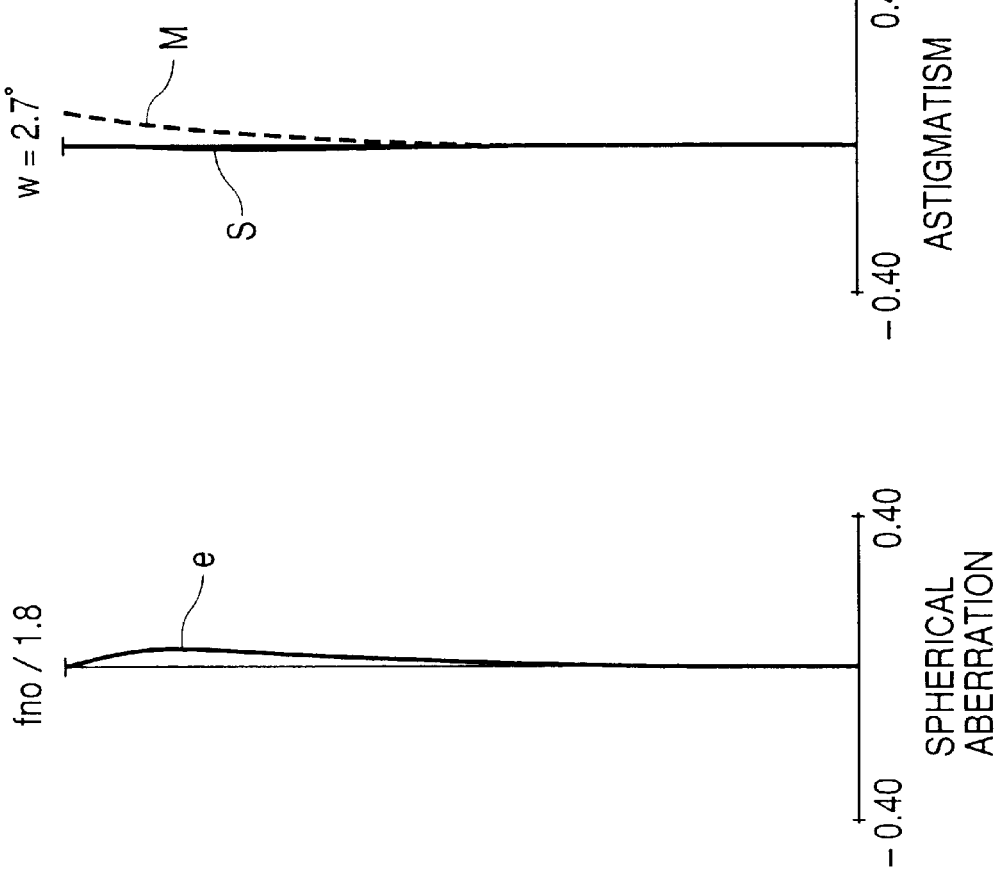

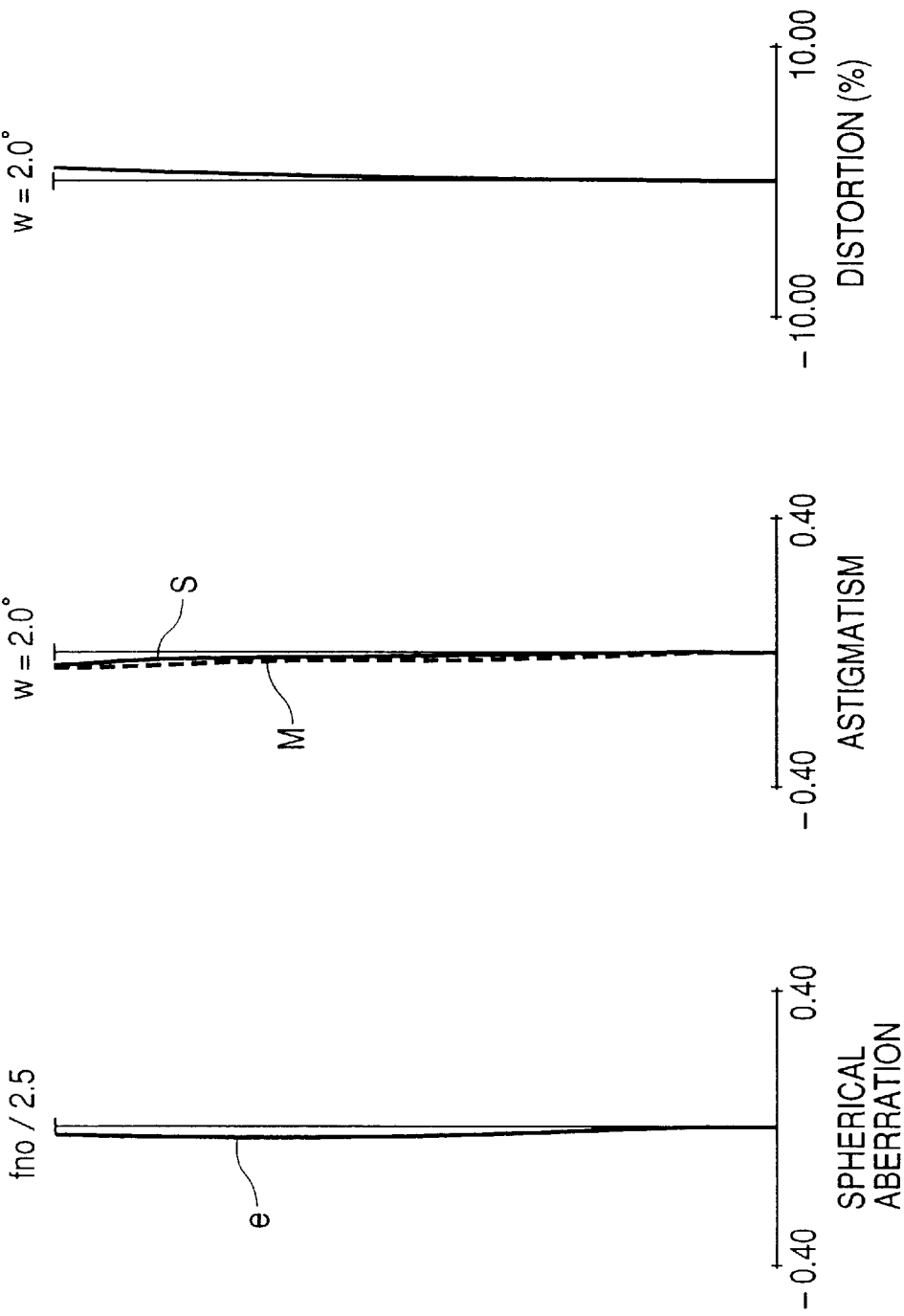

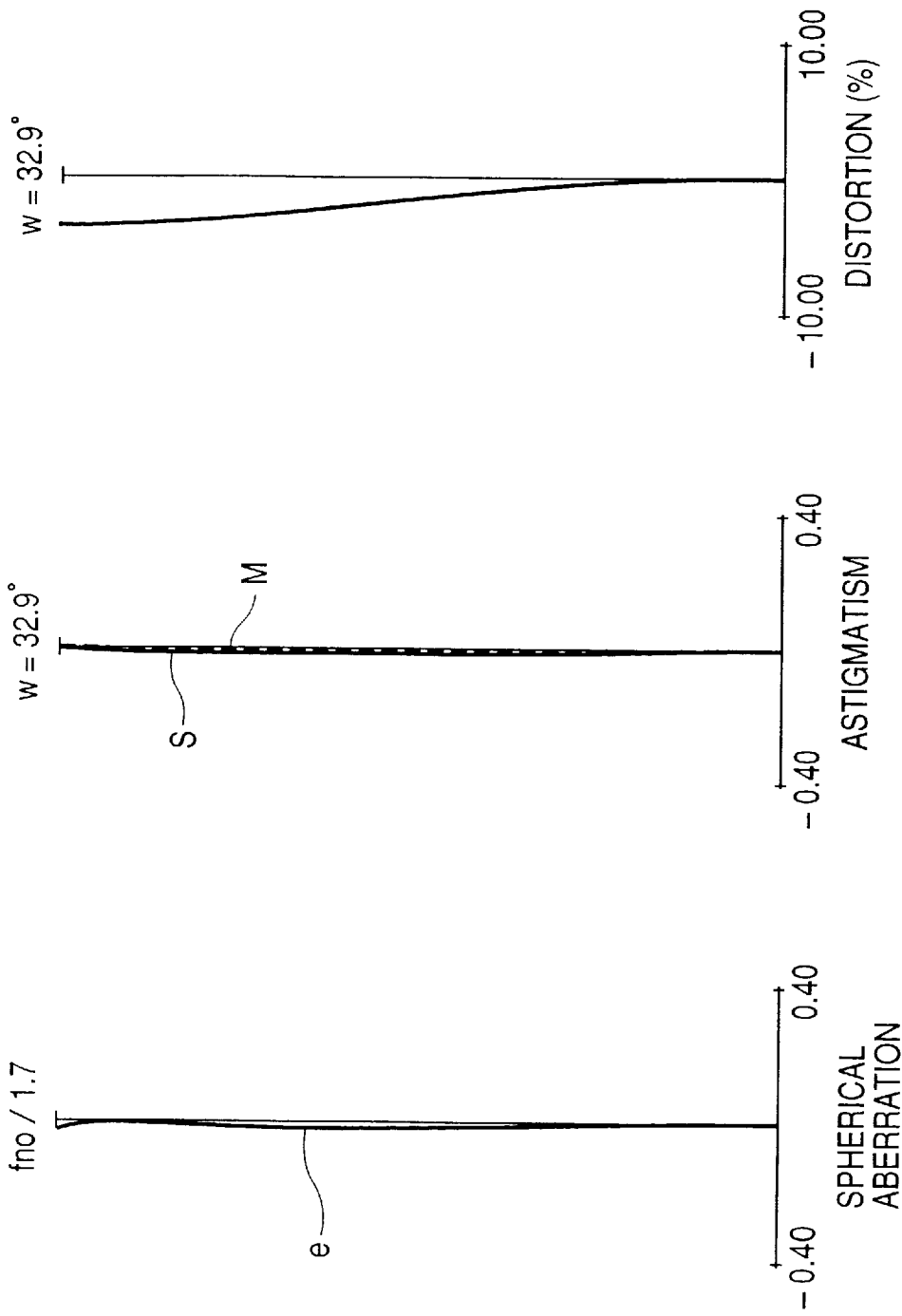
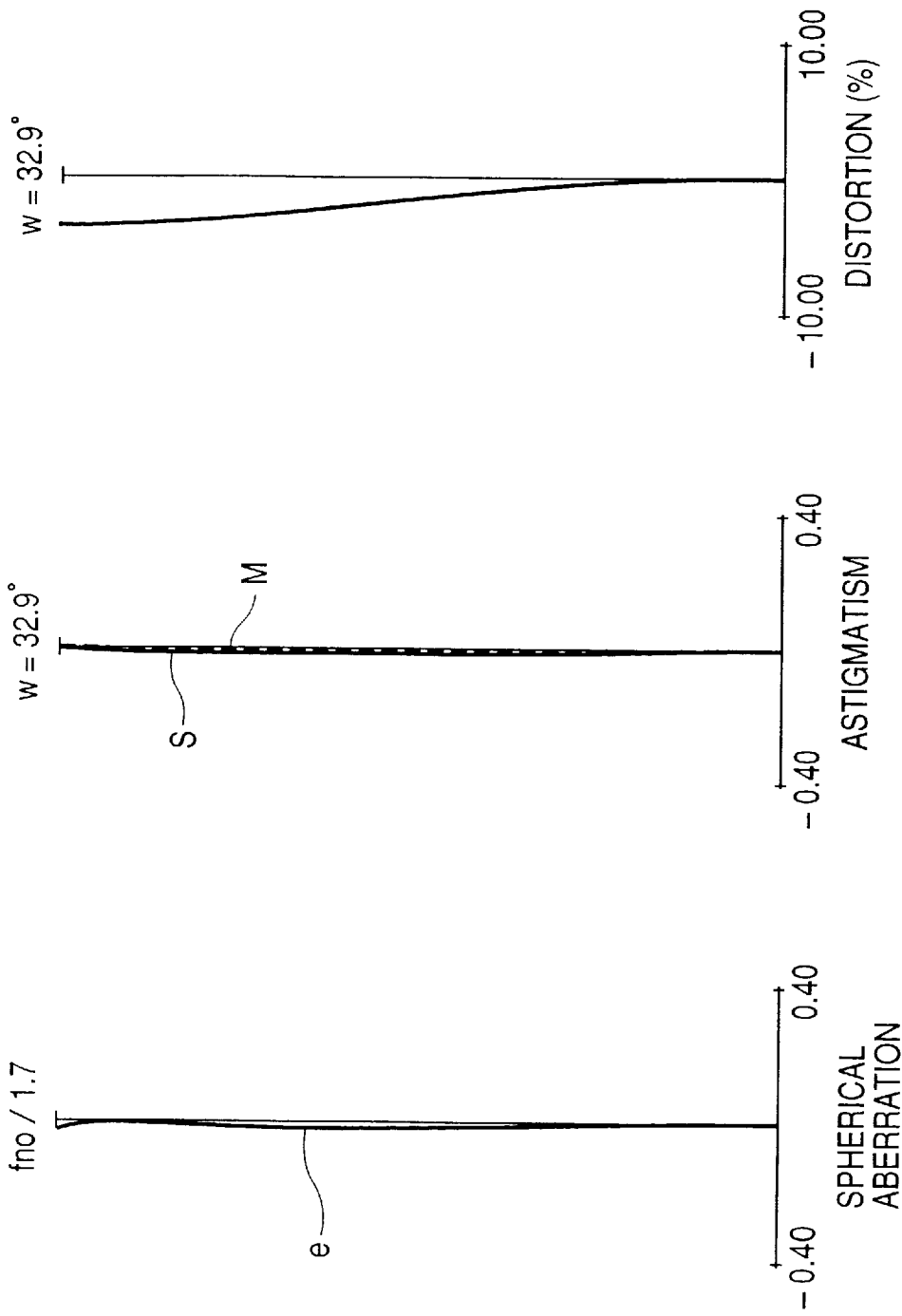
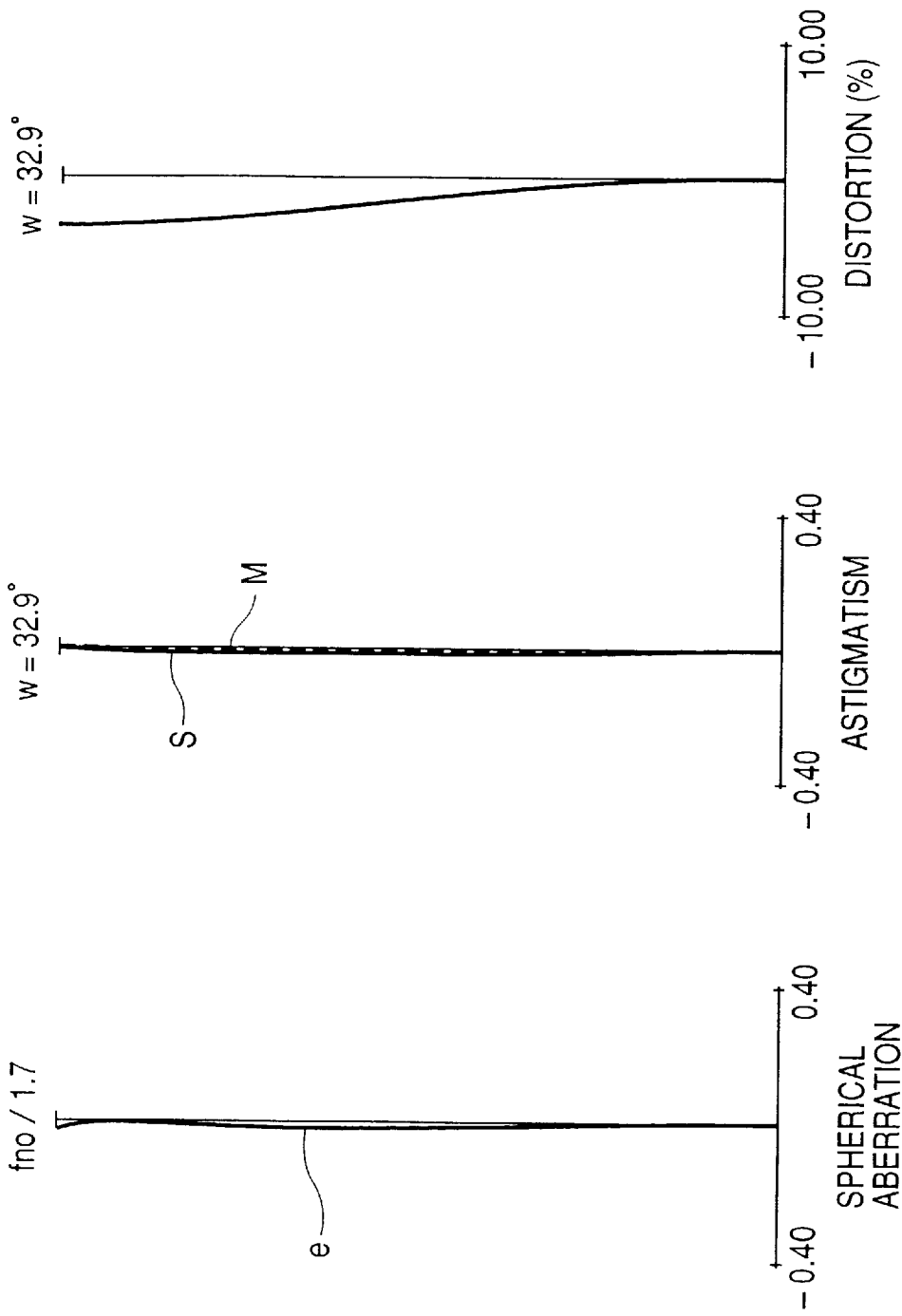

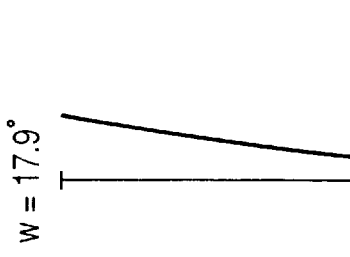

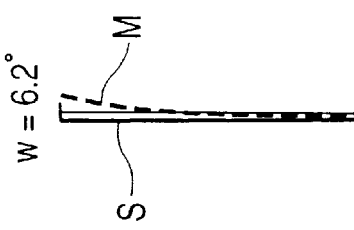
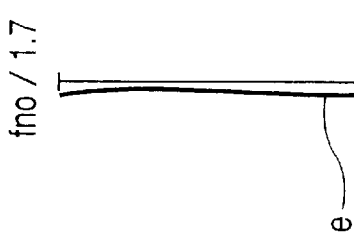

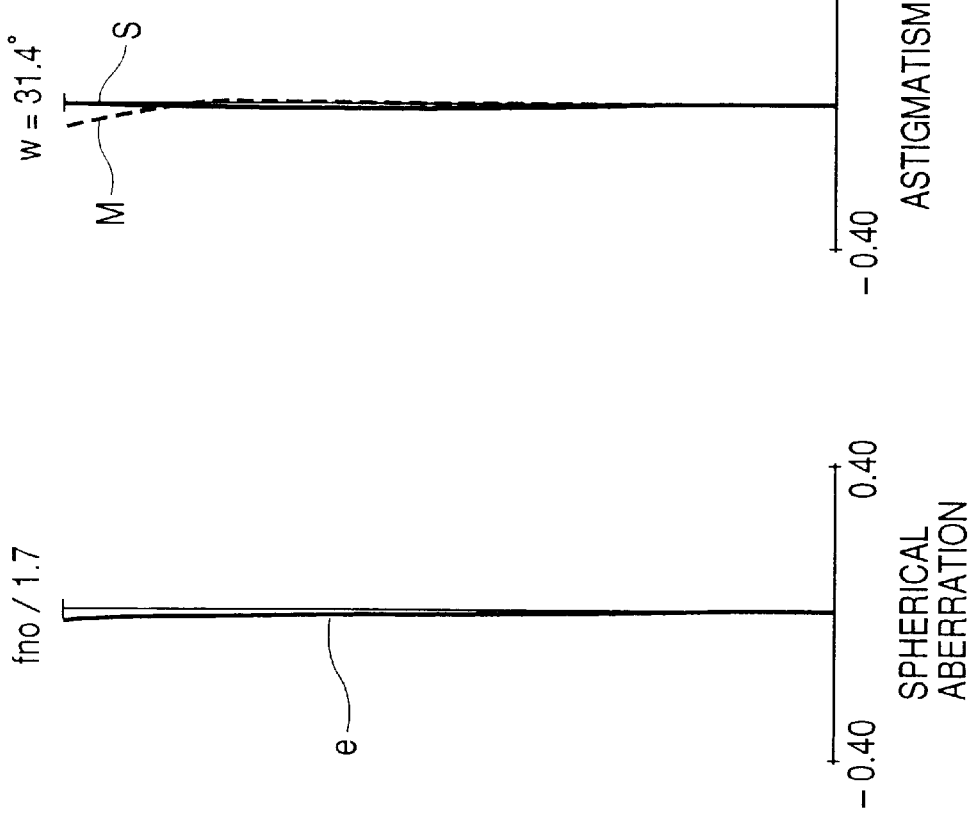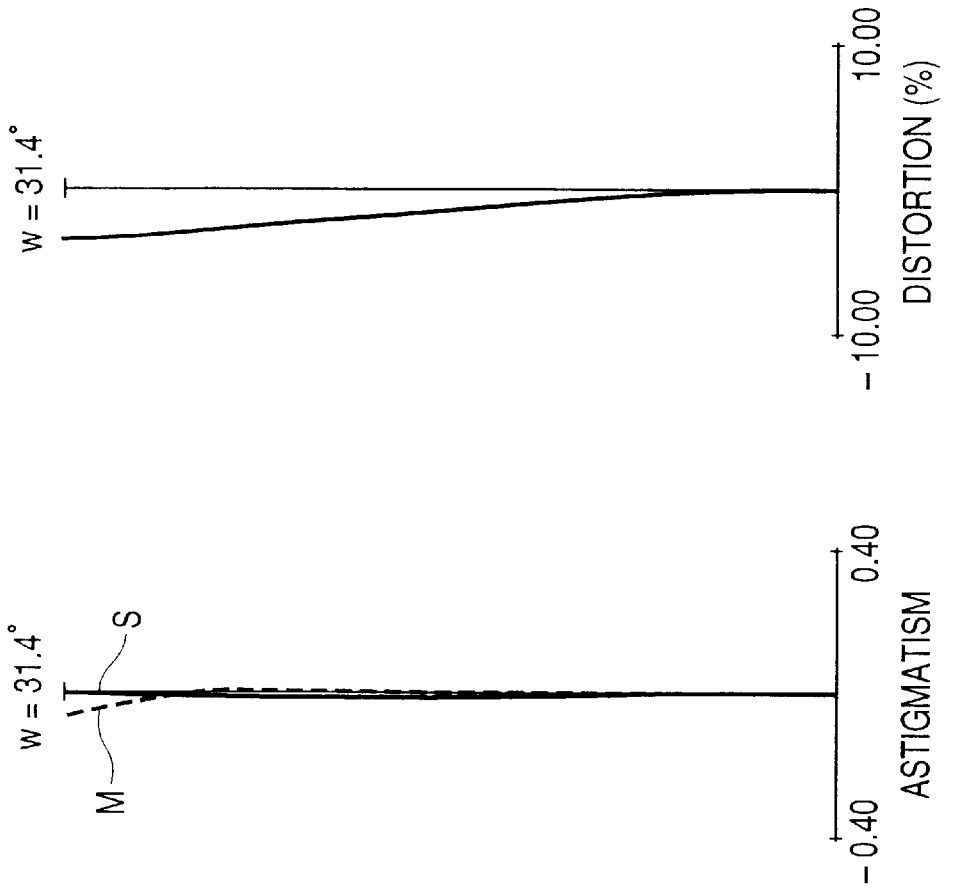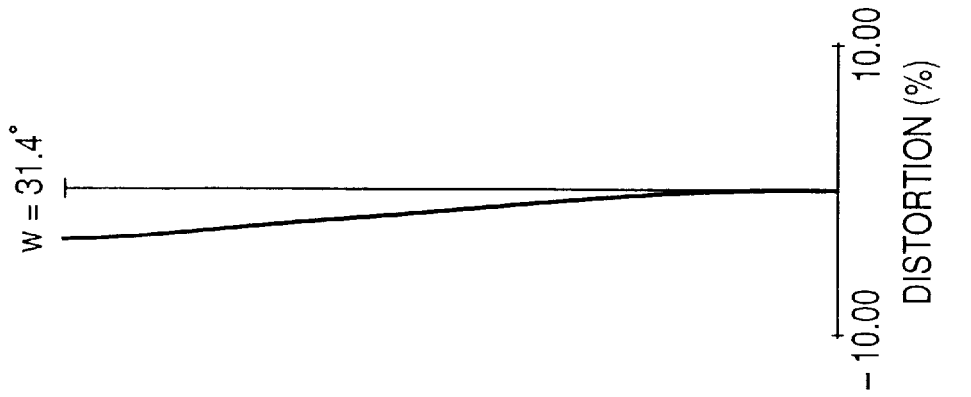

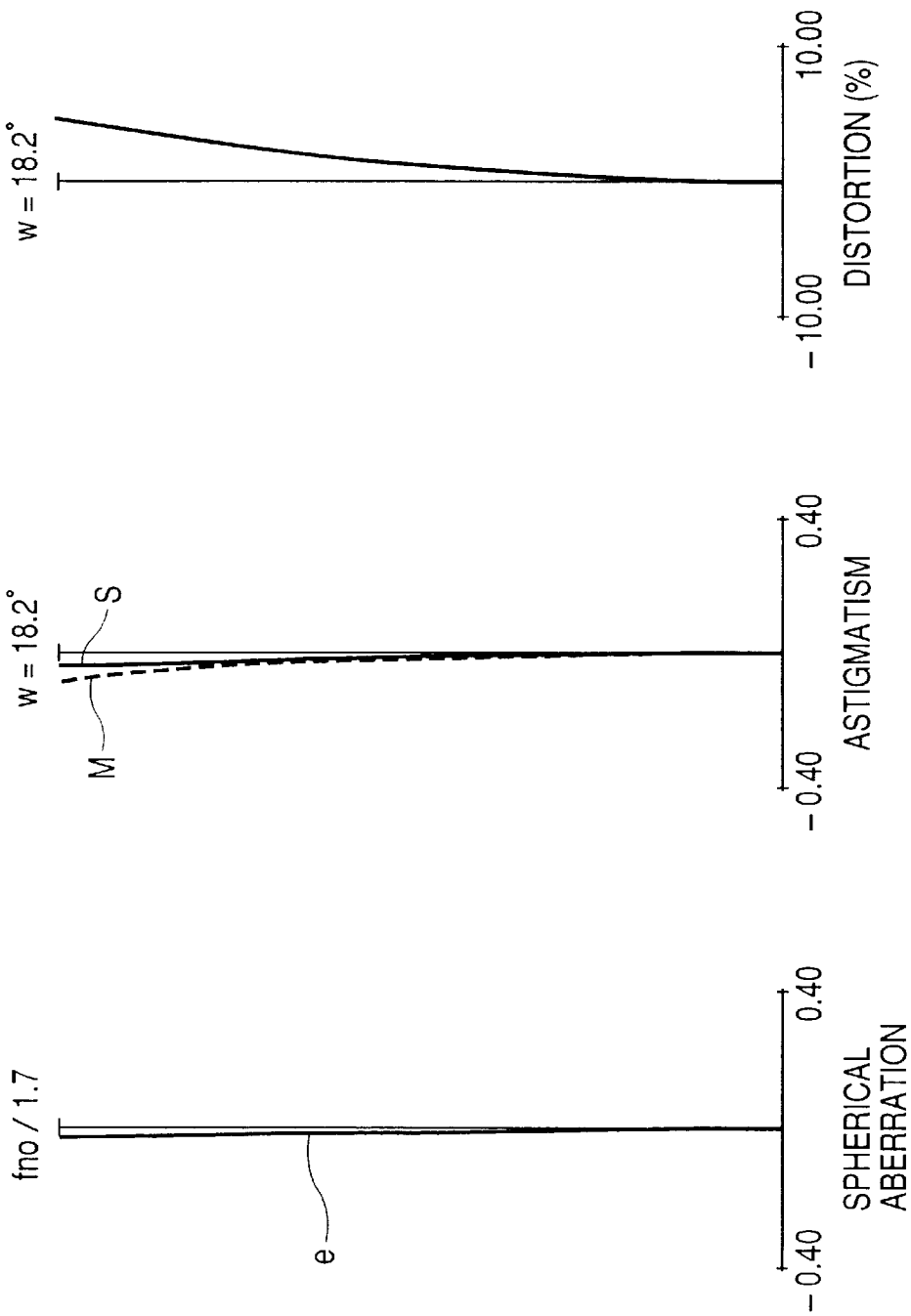

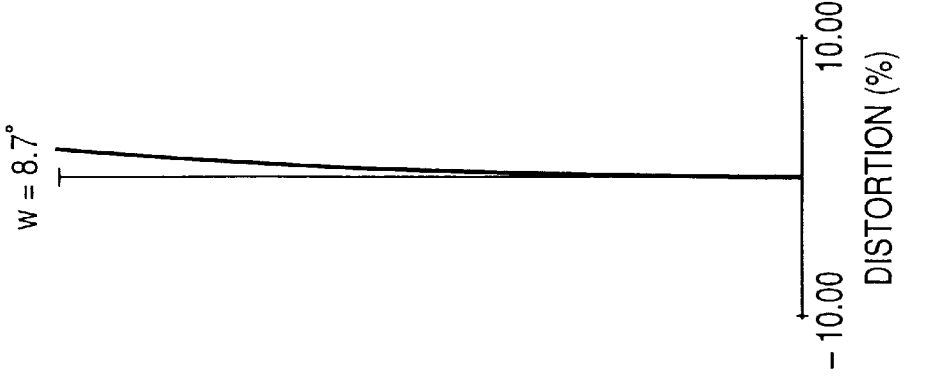
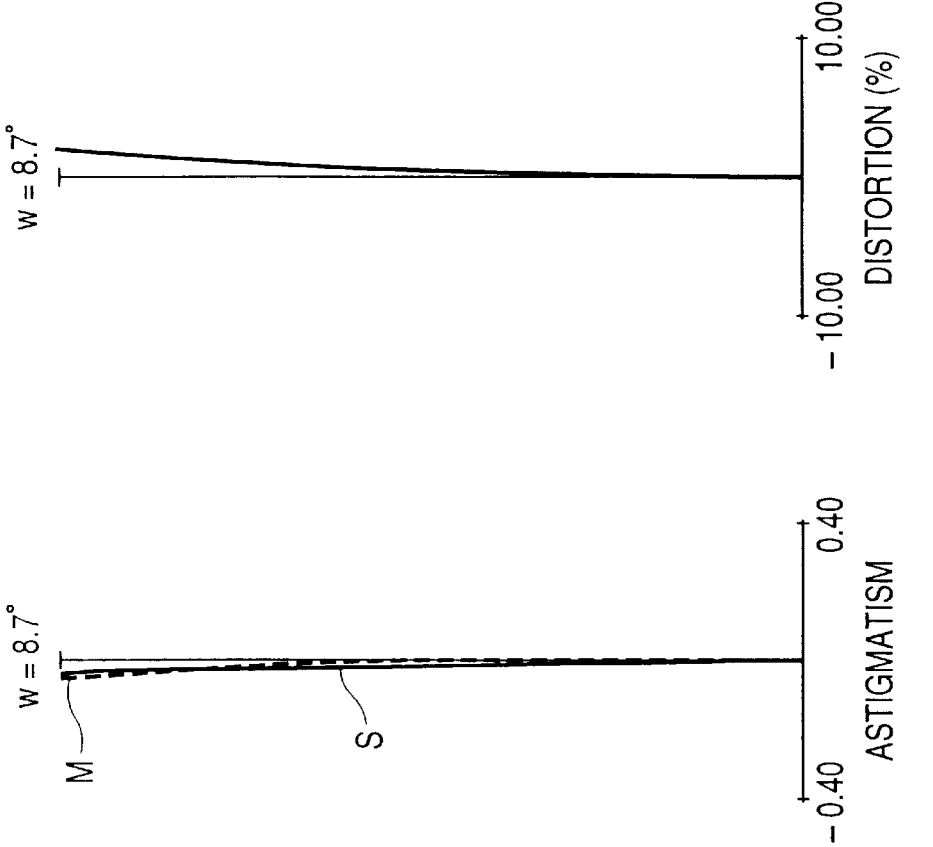
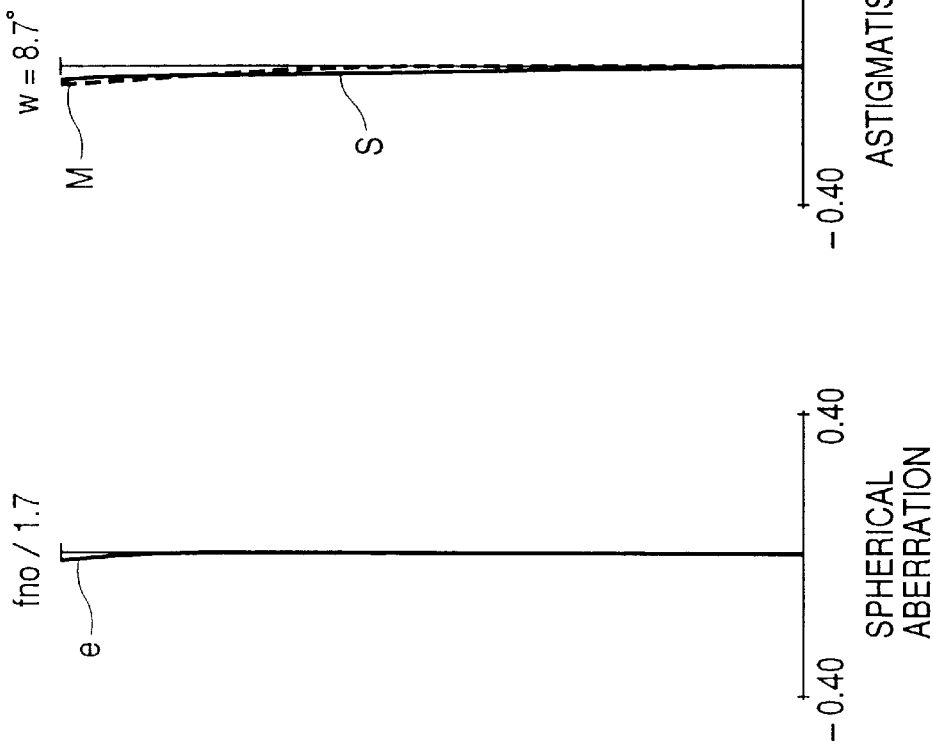

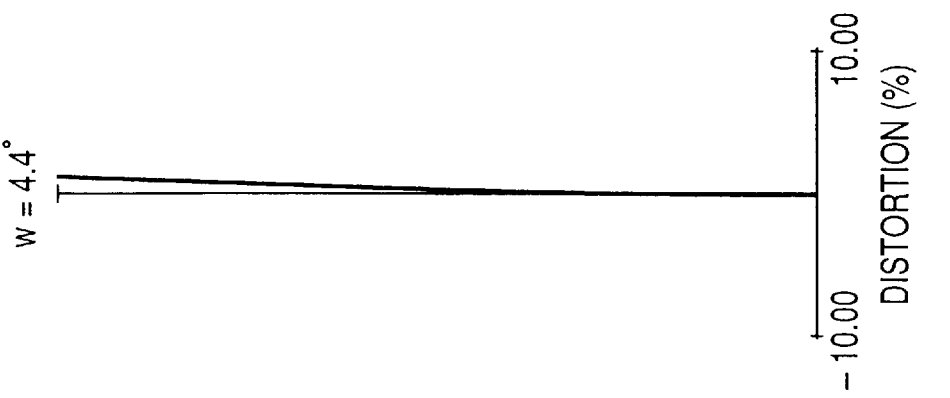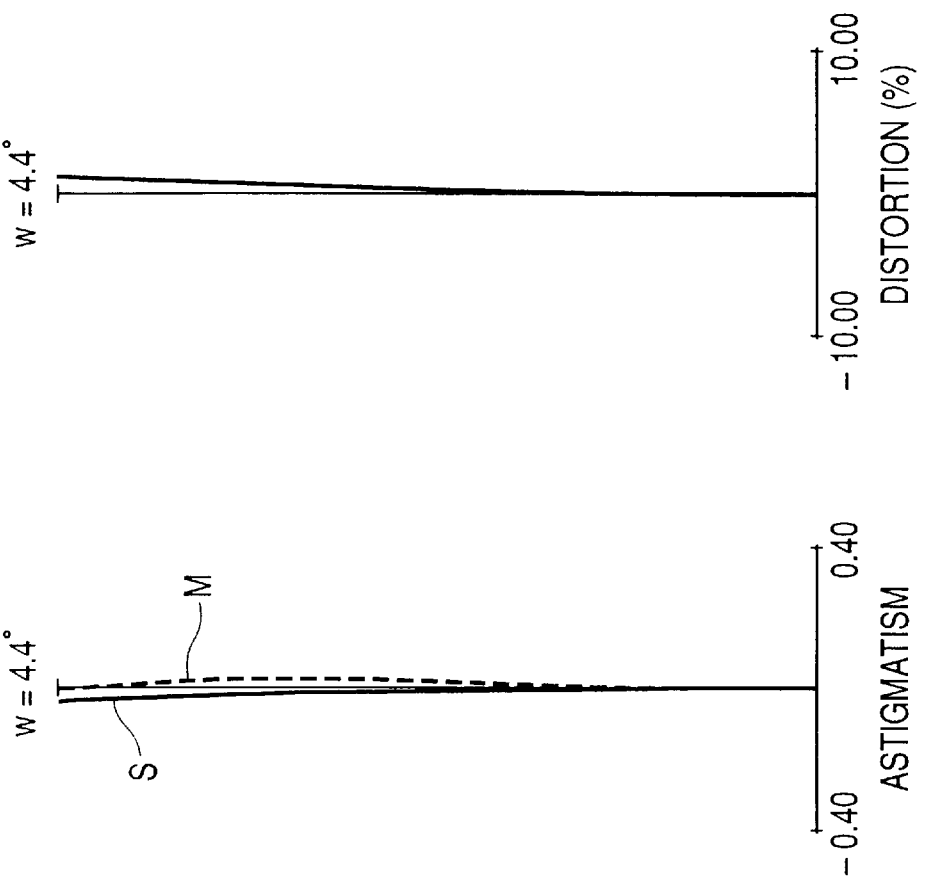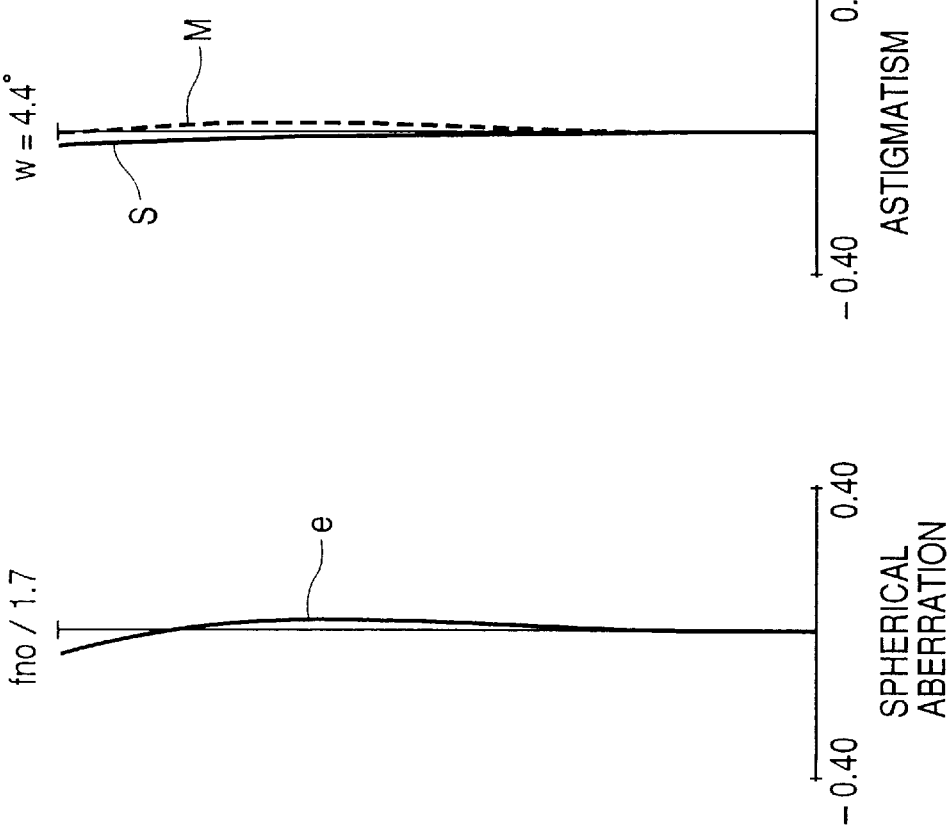

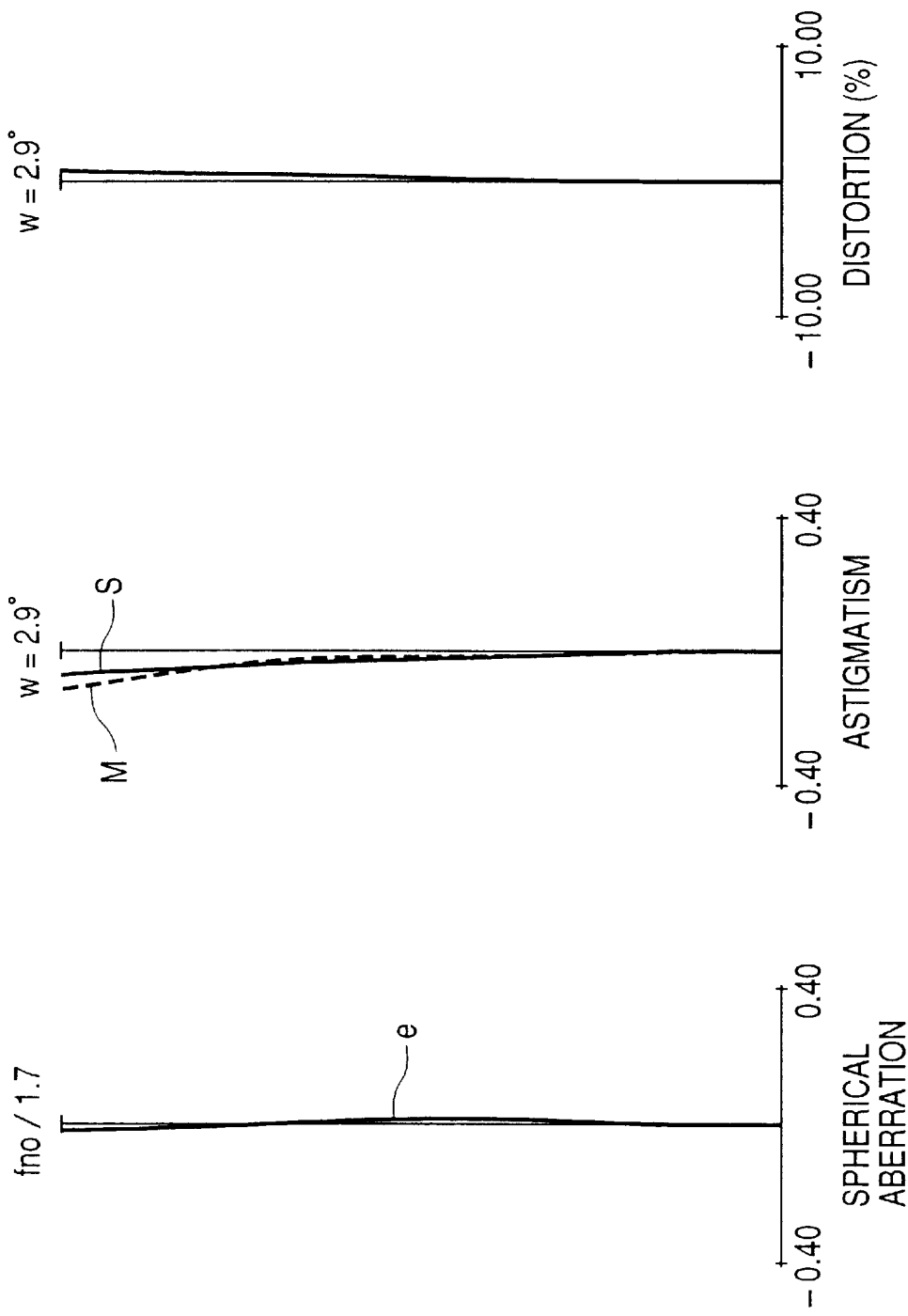

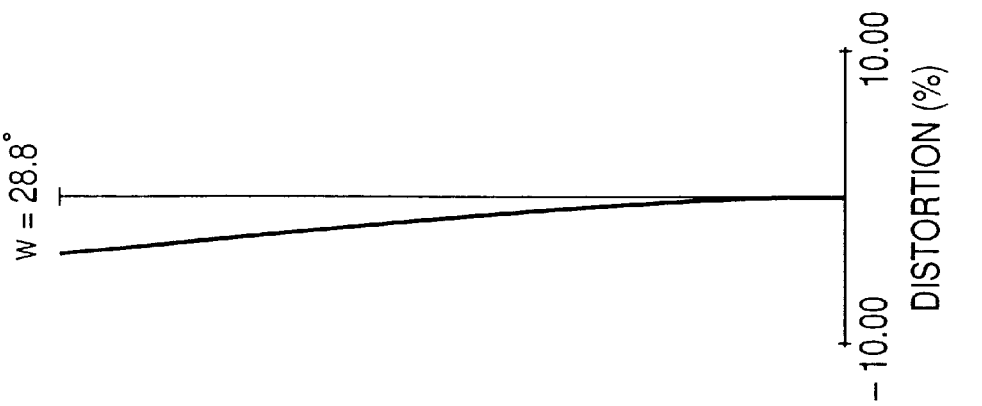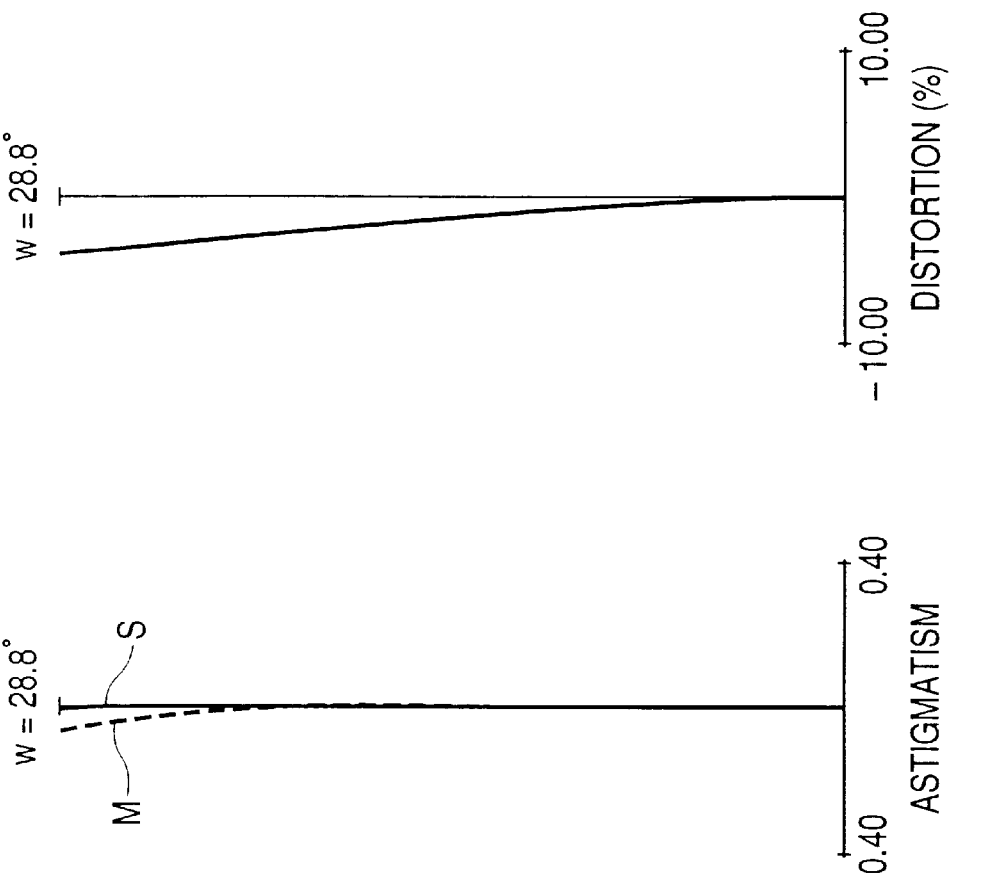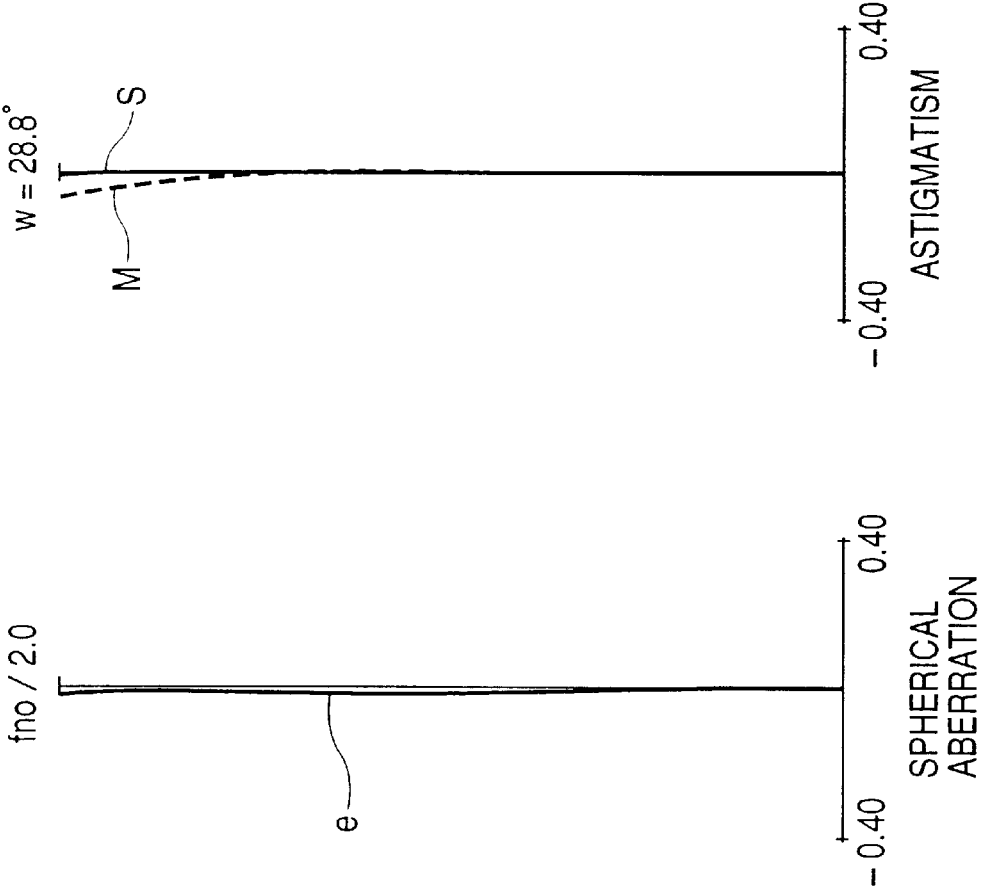

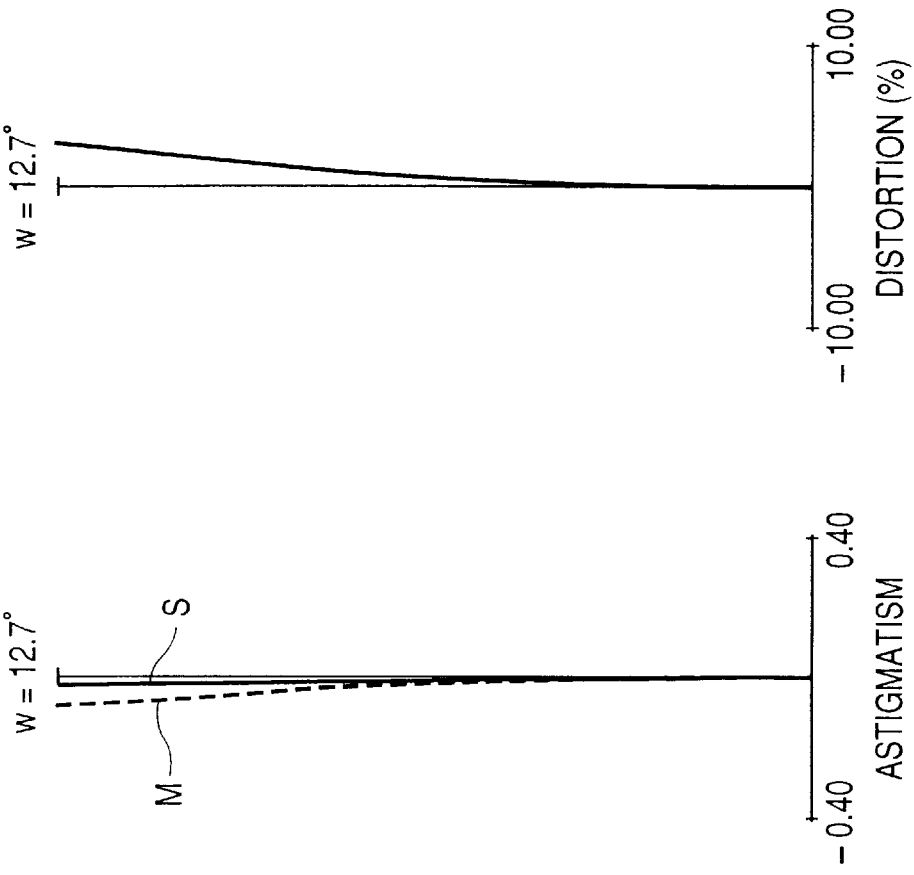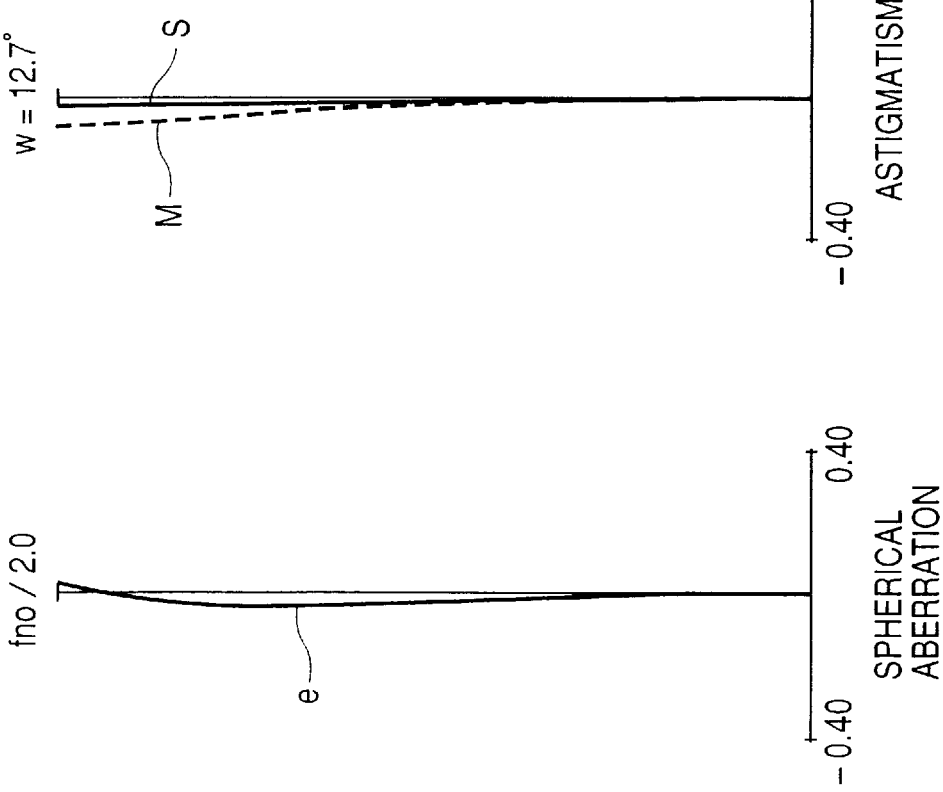

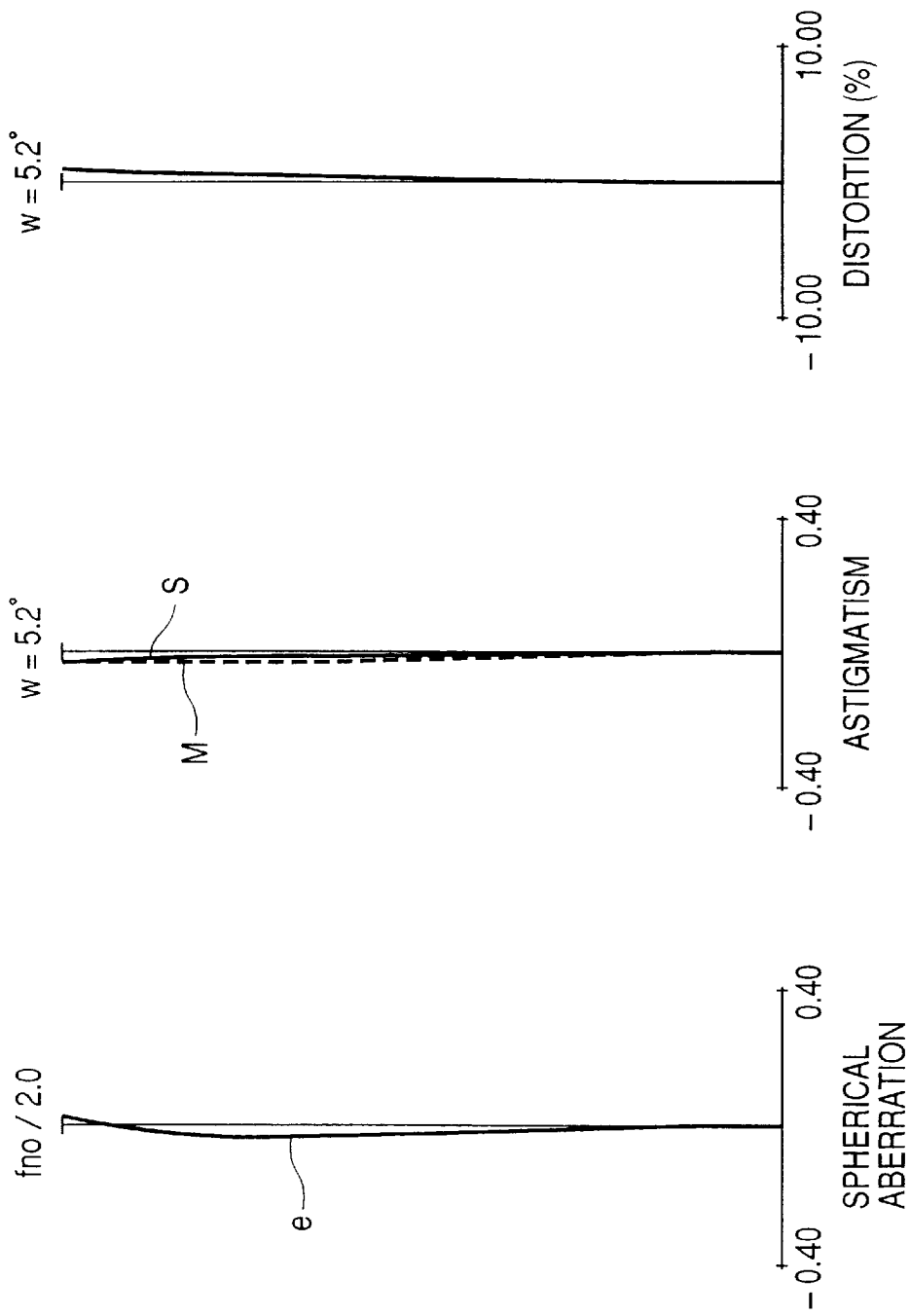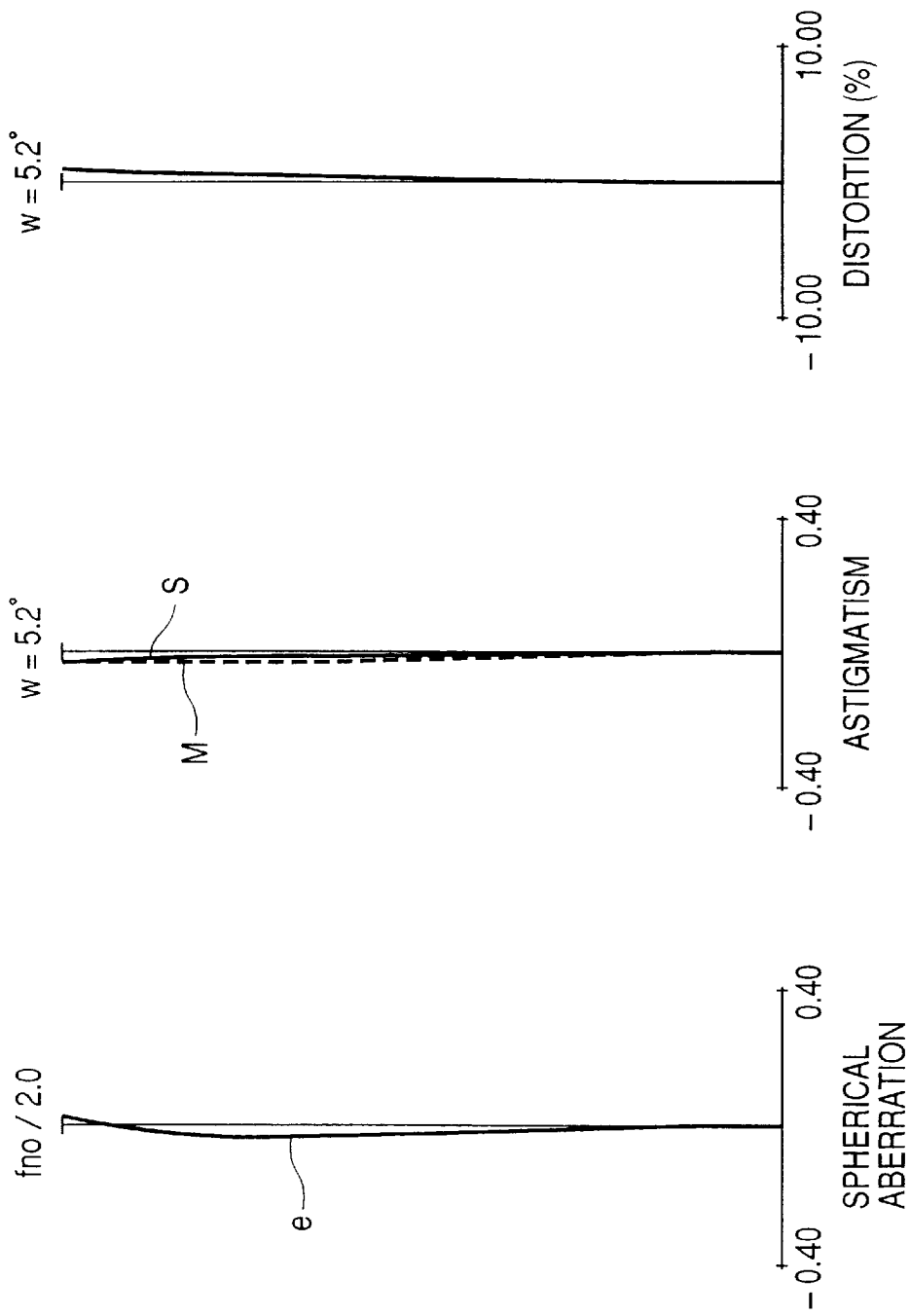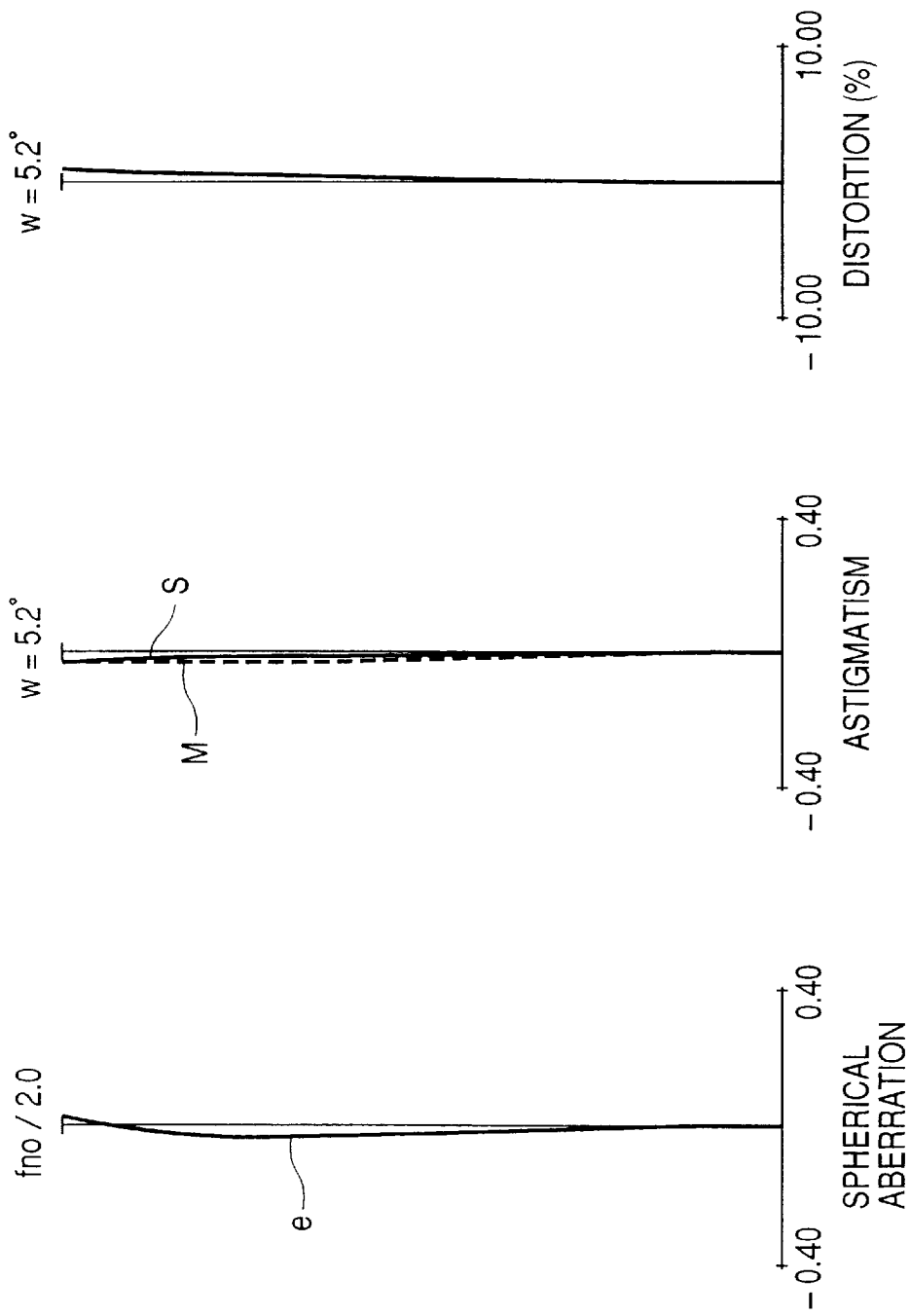

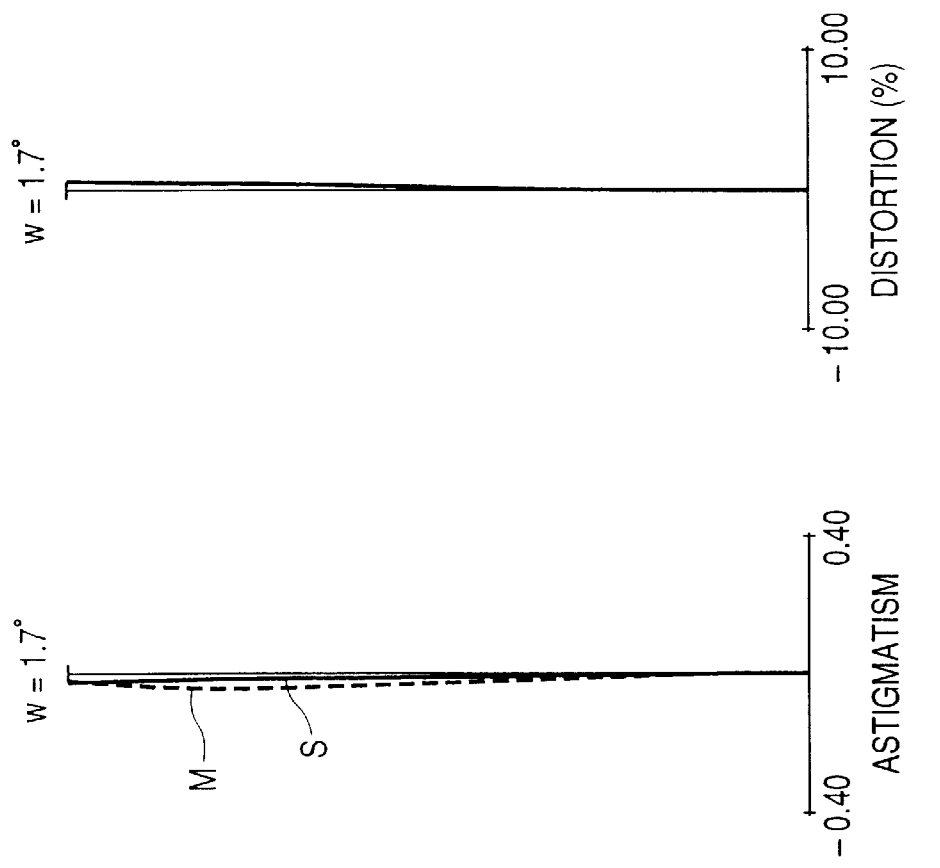

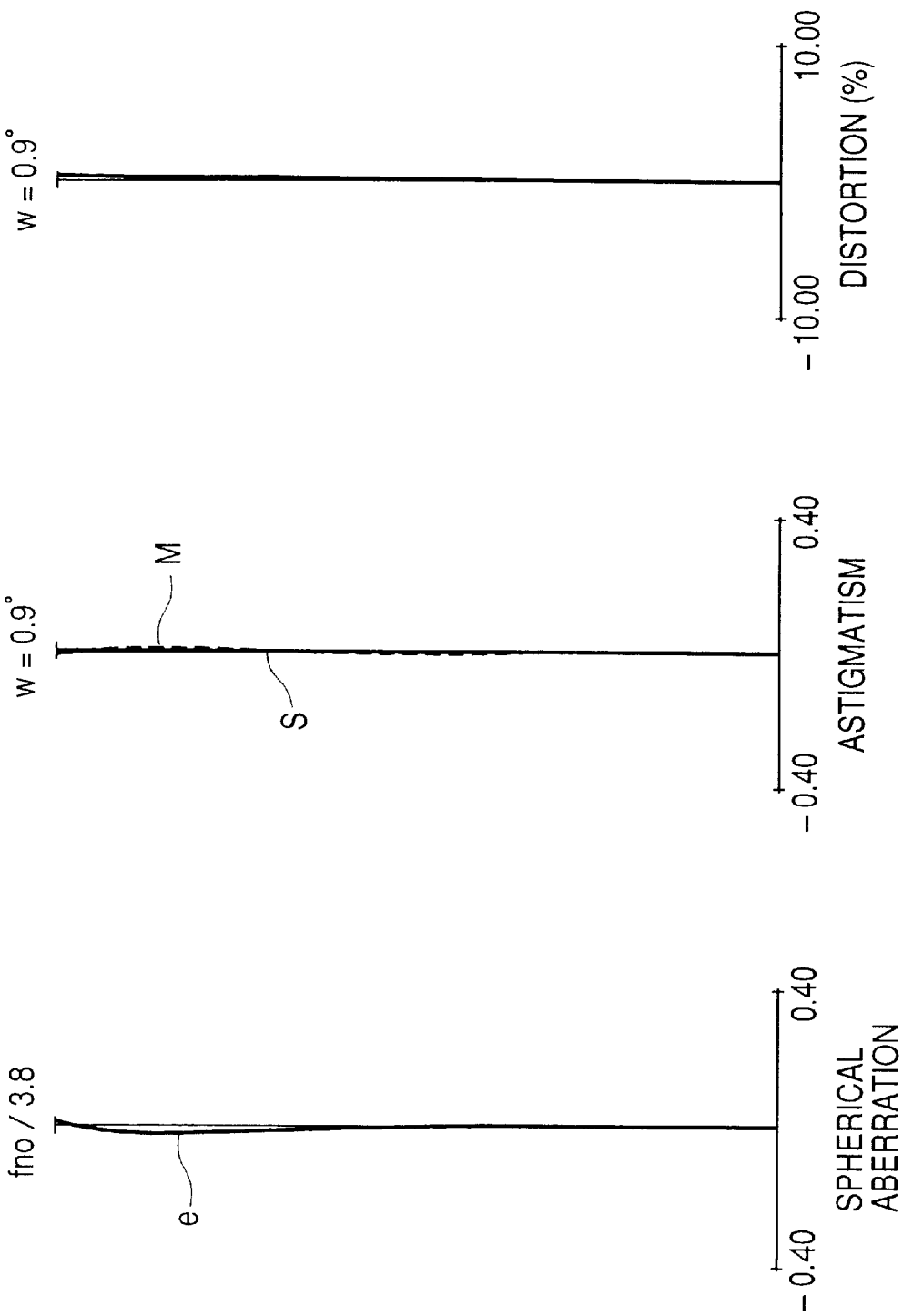

WIDE ANGLE END

TELEPHOTO END

TELEPHOTO END

ZOOM LENS

BACKGROUND OF THE INVENTION

1. Field of the Invention

This invention relates to a zoom lens, and particularly to a zoom lens suitable for a television camera, a phototaking camera, or a video camera, in which an aspherical surface is appropriately used in a portion of a lens system, whereby the zoom lens has good optical performance over an entire variable power range and has as large an aperture as the F-number of the order of 1.7 at the wide angle end and moreover a wide angle (a wide angle end angle of view 2ω=58°–70°) and as high a variable power ratio as a variable power ratio of the order of 12–35.

2. Related Background Art

Zoom lenses having a large aperture and high variable power and moreover having high optical performance have heretofore been required of television cameras, phototaking cameras and video cameras.

In addition, particularly in color television cameras for broadcasting, importance has been attached to operability and mobility and in compliance with these requirements, a compact CCD (solid state image pickup element) of ⅔ inch or ½ inch has become the mainstream as an image pickup device.

This CCD has its entire image pickup range having substantially uniform resolving power and therefore, for a zoom lens using it, it is required that the resolving power be substantially uniform from the center of the image field to the periphery of the image field.

For example, it is required that various aberrations such as astigmatism, distortion and chromatic difference of magnification be corrected well and the entire image field have high optical performance. Further, it is desired that the zoom lens have a large aperture, a wide angle and a high variable power ratio and moreover be compact and light in weight, and have a long back focus because a color resolving optical system and various kinds of filters are disposed forwardly of image pickup means.

Among zoom lenses, a so-called four-unit zoom lens comprising, in succession from the object side, four lens units, i.e., a first lens unit of positive refractive power for focusing, a second lens unit of negative refractive power for focal length change, a third lens unit of positive or negative refractive power for correcting the image place changing with a focal length change, and a fourth lens unit of positive refractive power for imaging can be relatively easily made to have a high variable power ratio and a large aperture and therefore is often used as a zoom lens for a color television camera for broadcasting.

Of four-unit zoom lenses, a four-unit zoom lens having a great aperture ratio and high variable power in which F-number is of the order of 1.6–1.9 and the variable power ratio is of the order of 13 is proposed, for example, in Japanese Laid-Open Patent Application No. 54-127322.

In a zoom lens, to obtain a great aperture ratio (F-number 1.7–1.8) and a high variable power ratio (variable power ratio 12–35) and a wide angle (a wide angle end angle of view 2ω=58°–70°) and moreover, high optical performance over the entire variable power range, it is necessary to set the refractive power and lens construction of each lens unit appropriately.

Generally, to have a small aberration fluctuation over the entire variable power range and obtain high optical performance, it becomes necessary to increase, for example, the number of lenses in each lens unit to thereby increase the degree of freedom of design in aberration correction.

Therefore, if an attempt is made to achieve a zoom lens having a great aperture ratio, a wide angle and a high variable power ratio, there unavoidably arises the problem that the number of lenses is increased and the entire lens system becomes bulky, and the desire for compactness and lighter weigh cannot be met.

Also, regarding the imaging performance, firstly, the changing of the point at the center of the image field whereat the image contrast is best, i.e., the so-called best image plane, resulting from a focal length change poses a problem. This is attributable chiefly to the changing of spherical aberration resulting from a focal length change. This spherical aberration influences by the cube of the aperture in the area of third-order aberration coefficient and therefore, is the greatest problem against a larger aperture.

Generally, the changing of spherical aberration resulting from a focal length change, when the zoom ratio is Z and the focal length of the wide angle end is fw, tends to become under (minus) relative to the Gaussian image plane from the wide angle end at which spherical aberration is 0 to the vicinity of a zoom position fm=fw×$Z^{1/4}$, as shown in FIG. 33 of the accompanying drawings. When the vicinity of the zoom position fm=fw×$Z^{1/4}$ is passed, the under amount becomes small and at a certain zoom position, it becomes 0 and now tends to become over (plus).

In the foregoing, fw is the focal length of the wide angle end, and Z is a zoom ratio.

The changing of spherical aberration becomes most over (plus) near a zoom position fd=(Fno. w/Fno. t)×ft at which F drop in which F-number becomes great (the lens system becomes dark) begins, and when this zoom position is passed, the over amount becomes small to the telephoto end, and becomes nearly 0 at the telephoto end.

In the foregoing, Fno. w and Fno. t are F-numbers at the wide angle end and the telephoto end, respectively, and ft is the focal length of the telephoto end.

As described above, particularly in a zoom lens having a position at which F drop begins, the control of spherical aberration on the telephoto side becomes very difficult.

Next, regarding the wider angle of a zoom lens, of the imaging performance, distortion becomes the greatest problem. This is because in the area of third-order aberration coefficient, distortion influences by the cube of the angle of view.

As shown in FIG. 34 of the accompanying drawings, distortion is considerably greatly under (minus) at the wide angle end (focal length fw). From the wide angle end fw toward the telephoto end (focal length ft), distortion sequentially becomes greater in the over (plus) direction, and passes a zoom position at which distortion is 0, and the over value becomes greatest near the zoom position fm=fw×$Z^{1/4}$. From the focal length fm to the telephoto end ft, the over amount sequentially becomes smaller. This tendency becomes greater as the angle of view at the wide angle end becomes greater and therefore, when the wider angle of a zoom lens is contrived, the control of distortion on the wide angle end becomes very difficult.

In order to correct such changing of various aberrations well over the entire variable power range, the number of lenses in the lens unit for focusing or the focal length changing system has been increased to thereby correct it. This has led to the problem that the entire lens system becomes bulky and complicated.

Also, the introduction of an aspherical surface for the solution of such a problem is proposed, for example, in Japanese Laid-Open Patent Application No. 7-35978.

However, the specification of zoom lenses has been improved, and in a zoom lens having a great aperture ratio and moreover having a high variable power ratio beginning from a super-wide angle, the revision of the method of introducing an aspherical surface has become necessary.

In a zoom lens having a great aperture ratio and moreover having a high variable power ratio beginning from a super-wide angle, spherical aberration changes greatly on the telephoto side and distortion changes greatly on the wide angle side. To correct both of these aberrations well, it is necessary to apply an aspherical surface on to an appropriate lens surface in a focal length changing portion.

SUMMARY OF THE INVENTION

The present invention has as its object the provision of a so-called four-unit zoom lens having an F-number of the order of 1.7 at the wide angle end and a wide angle (a wide angle end angle of view $2\omega=58°–70°$) as well as a great aperture ratio of the order of 12–35 and a high variable power ratio in which the refractive power, F-number value, etc. of each lens unit are appropriately set and an aspherical surface is provided on at least one lens surface to thereby reduce the changing of various aberrations resulting from a focal length change and particularly spherical aberration on the telephoto side and distortion on the wide angle side are corrected well and which has high optical performance over the entire variable power range.

The zoom lens of the present invention is a zoom lens which has, in succession from the object side, a first lens unit of positive refractive power fixed during a focal length change, a second lens unit of negative refractive power for focal length change, a third lens unit for correcting the changing of an image plane resulting from a focal length change, and a fixed fourth lens unit of positive refractive power and in which when in the first lens unit, the zoom ratio is Z and the maximum incidence height of an on-axis light beam is ht and the maximum incidence height in an off-axis light beam of a maximum angle of view at the wide angle end is hw and the maximum incidence height of the off-axis light beam of the maximum angle of view at a zoom position at a variable power ratio $Z^{1/4}$ is hz, an aspherical surface AS1 is provided on at least one lens surface at a position satisfying 0.95>hw/ht and 0.90>hw/hz, the aspherical surface AS1, when provided on a positive refracting surface, forms a shape in which positive refractive power becomes weaker toward the peripheral portion of the lens, and when provided on a negative refracting surface, forms a shape in which negative refractive power becomes stronger toward the peripheral portion of the lens, and when the aspherical amounts of the aspherical surface AS1 at 100%, 90% and 70% of the effective diameter of the lens are $\Delta 10$, $\Delta 9$ and $\Delta 7$, respectively, and focal length of the first lens unit is f1, the following conditions are satisfied:

$$3.7 \times 10^{-4} < |\Delta 10 / f1| < 4.6 \times 10^{-3} \quad (1)$$

$$2.2 \times 10^{-4} < |\Delta 9 / f1| < 3.0 \times 10^{-3}$$

$$6.7 \times 10^{-5} < |\Delta 7 / f1| < 1.1 \times 10^{-3}$$

Also, when the focal length and F-number of the total system at the telephoto end are ft and Fno. t, respectively, and the focal length of the first lens unit is f1 and the F-number thereof is Fno. 1=f1/(ft/Fno. t) and the lateral magnification of the second lens unit at the wide angle end is $\beta 2w$ and the zoom ratio thereof is Z, the following conditions are satisfied:

$$10 < Z$$

$$0.8 < \text{Fno. 1} < 1.6 \quad (2)$$

$$-0.45 < \beta 2w < -0.15 \quad (3)$$

Also, the first lens unit is comprised, in succession from the object side, of at least one negative lens and at least three positive lenses, and when the Abbe number of the negative lens is $v1n$ and the average value of the Abbe numbers of the three positive lenses is $v1p$, the first lens unit satisfies the following condition:

$$|v1n - v1p| > 42.5 \quad (4)$$

Further, at least one aspherical surface AS2 is applied to the second lens unit, and the aspherical surface AS2, when provided on a positive refracting surface, forms a shape in which positive refractive power becomes stronger toward the peripheral portion of the lens, and when provided on a negative refracting surface, forms a shape in which negative refractive power becomes weaker.

BRIEF DESCRIPTION OF THE DRAWINGS

FIGS. 5A, 5B and 5C show the aberrations of Embodiment 1 of the present invention at a focal length f=8.0.

FIGS. 6A, 6B and 6C show the aberrations of Embodiment 1 of the present invention at a focal length f=16.9.

FIGS. 7A, 7B and 7C show the aberrations of Embodiment 1 of the present invention at a focal length f=48.0.

FIGS. 8A, 8B and 8C show the aberrations of Embodiment 1 of the present invention at a focal length f=115.2.

FIGS. 9A, 9B and 9C show the aberrations of Embodiment 1 of the present invention at a focal length f=160.0.

FIGS. 10A, 10B and 10C show the aberrations of Embodiment 2 of the present invention at a focal length f=8.5.

FIGS. 11A, 11B and 11C show the aberrations of Embodiment 2 of the present invention at a focal length f=17.0.

FIGS. 12A, 12B and 12C show the aberrations of Embodiment 2 of the present invention at a focal length f=51.0.

FIGS. 15A, 15B and 15C show the aberrations of Embodiment 3 of the present invention at a focal length f=9.0.

FIGS. 16A, 16B and 16C show the aberrations of Embodiment 3 of the present invention at a focal length f=16.8.

FIGS. 17A, 17B and 17C show the aberrations of Embodiment 3 of the present invention at a focal length f=36.0.

FIGS. 18A, 18B and 18C show the aberrations of Embodiment 3 of the present invention at a focal length f=72.0.

FIGS. 19A, 19B and 19C show the aberrations of Embodiment 3 of the present invention at a focal length f=108.0.

FIGS. 20A, 20B and 20C show the aberrations of Embodiment 4 of the present invention at a focal length f=10.0.

FIGS. 21A, 21B and 21C show the aberrations of Embodiment 4 of the present invention at a focal length f=24.3.

FIGS. 22A, 22B and 22C show the aberrations of Embodiment 4 of the present invention at a focal length f=60.0.

FIGS. 23A, 23B and 23C show the aberrations of Embodiment 4 of the present invention at a focal length f=184.0.

FIGS. 24A, 24B and 24C show the aberrations of Embodiment 4 of the present invention at a focal length f=350.0.

DESCRIPTION OF THE PREFERRED EMBODIMENTS

FIGS. 1 to 4 are lens cross-sectional views of Numerical Value Embodiments 1 to 4 of the present invention at the wide angle end thereof.

In FIGS. 1 to 4, the letter F designates a focusing lens unit (front lens unit) of positive refractive power as a first lens unit.

The letter V denotes a variator of negative refractive power for focal length change as a second lens unit, and the variator V is monotonously (monotonically) moved on the optical axis thereof toward the image plane side to thereby effect a focal length change from the wide angle end (wide) to the telephoto end (tele). The letter C designates a compensator of negative refractive power, and the compensator C is moved non-linearly with a convex locus on the optical axis thereof toward the object side to correct the changing of the image plane resulting from a focal length change. The variator V and the compensator C together constitute a focal length changing system.

The letters SP denote a stop, and the letter R designates a fixed relay lens unit of positive refractive power as a fourth lens unit. The letter P denotes a color resolving prism, an optical filter or the like which is shown as a glass block in FIGS. 1 to 4.

In the zoom lens shown in FIGS. 1 to 4, the above-mentioned conditions are satisfied to thereby correct the changing of aberrations well over an entire variable power range and obtain high optical performance.

Description will now be made of the features of the aspherical surface of the zoom lens according to the present invention.

Figure 27:
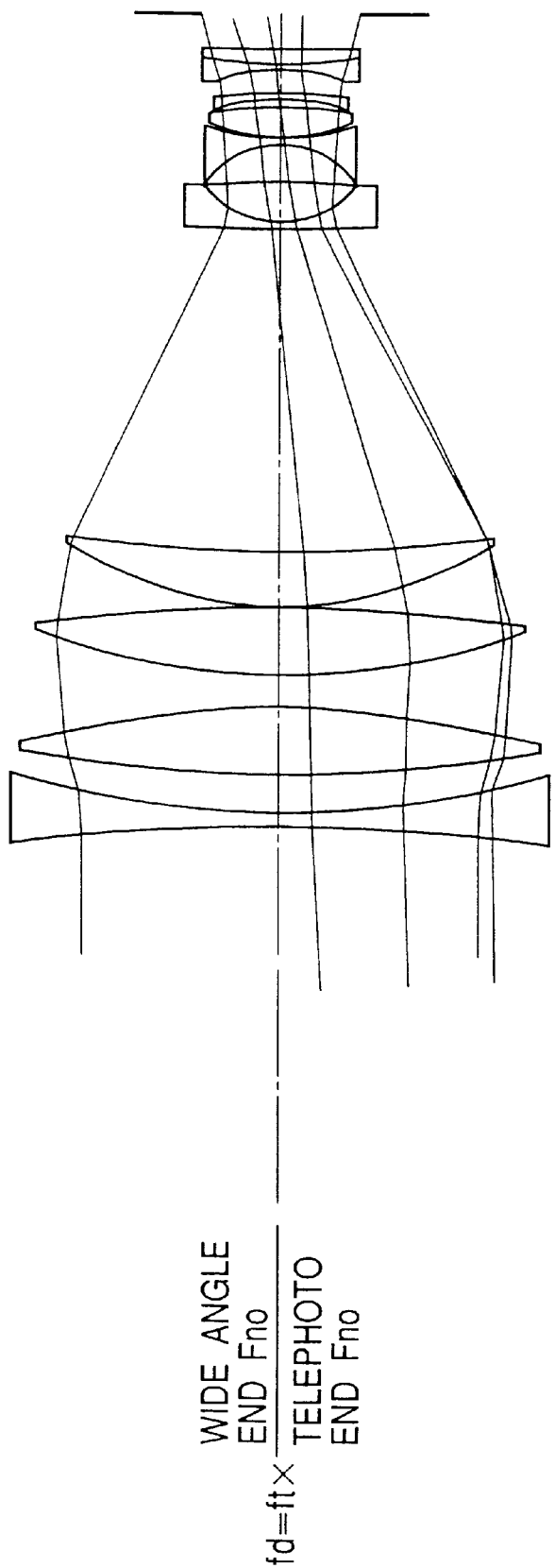
FIG. 27 shows the optical path of a portion of FIG. 1.
Figure 28:
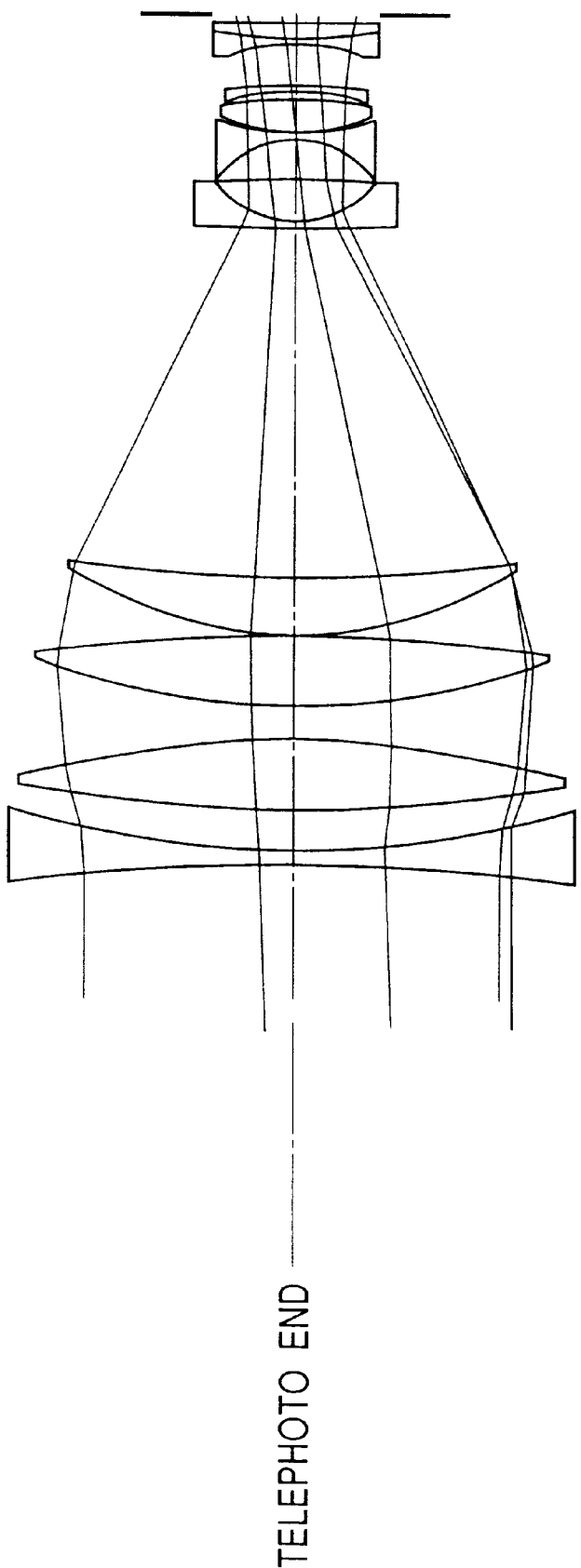
FIG. 28 shows the optical path of a portion of FIG. 1.
Figure 29:
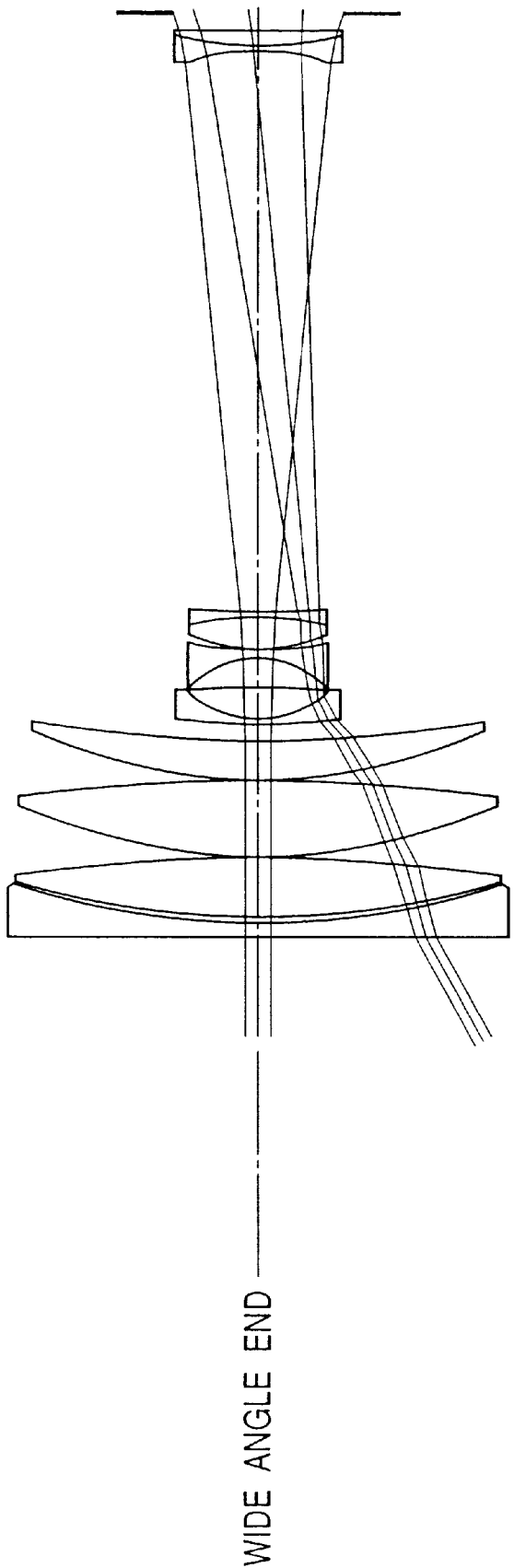
FIG. 29 shows the optical path of a portion of FIG. 4.
Figure 30:
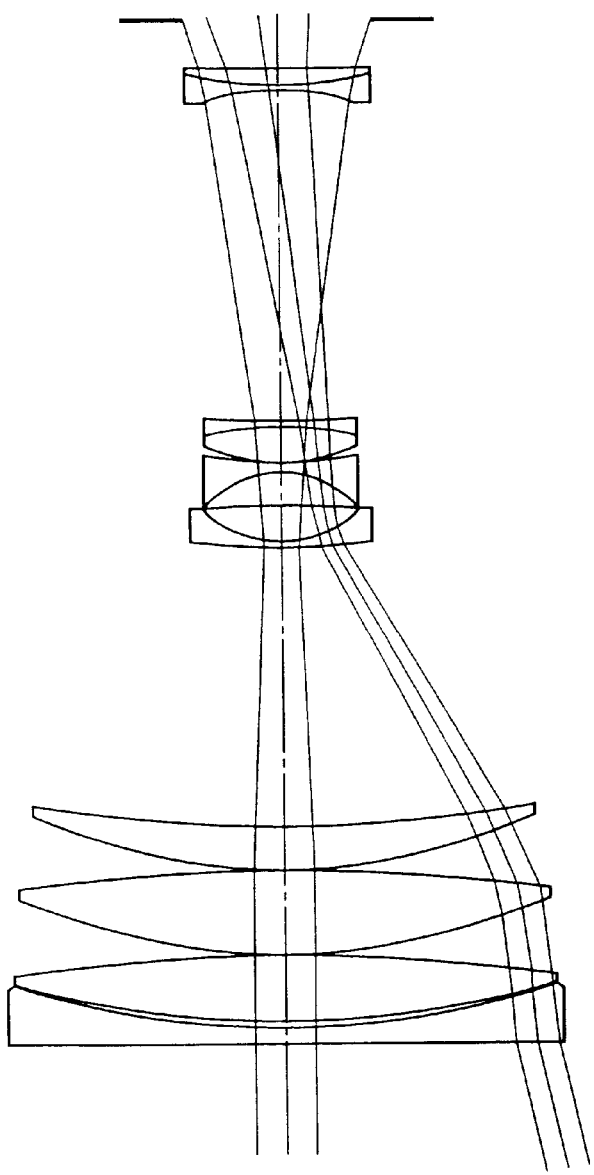
FIG. 30 shows the optical path of a portion of FIG. 4.
Figure 31:
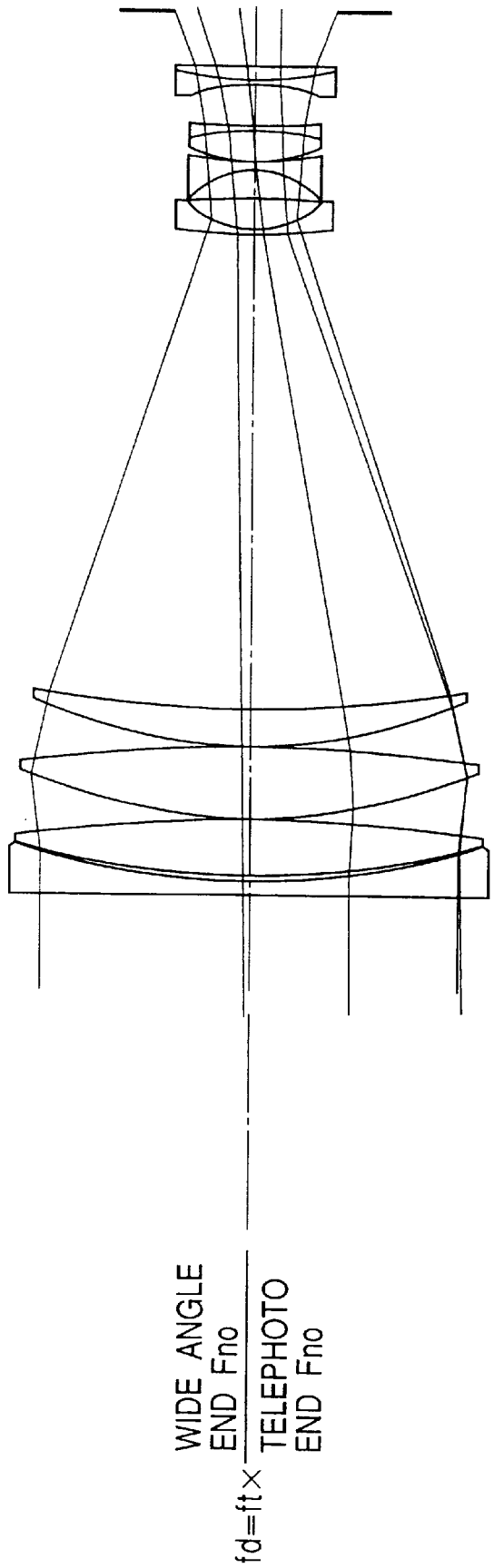
FIG. 31 shows the optical path of a portion of FIG. 4.
Figure 32:
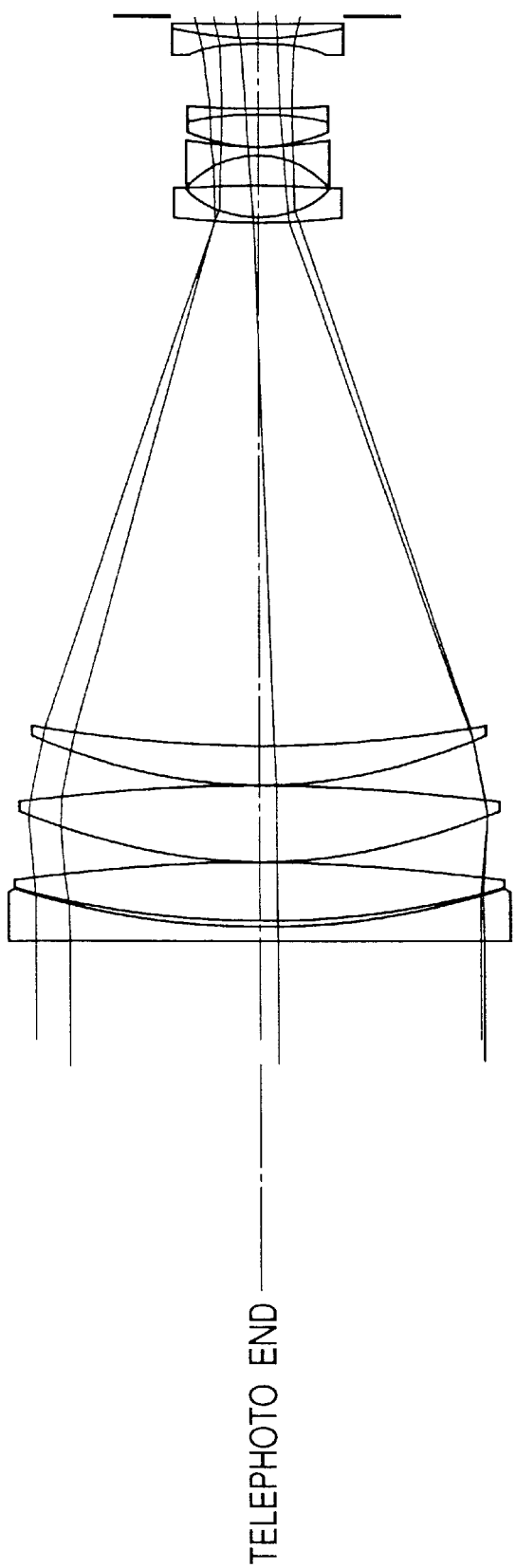
FIG. 32 shows the optical path of a portion of FIG. 4.
Figure 33:
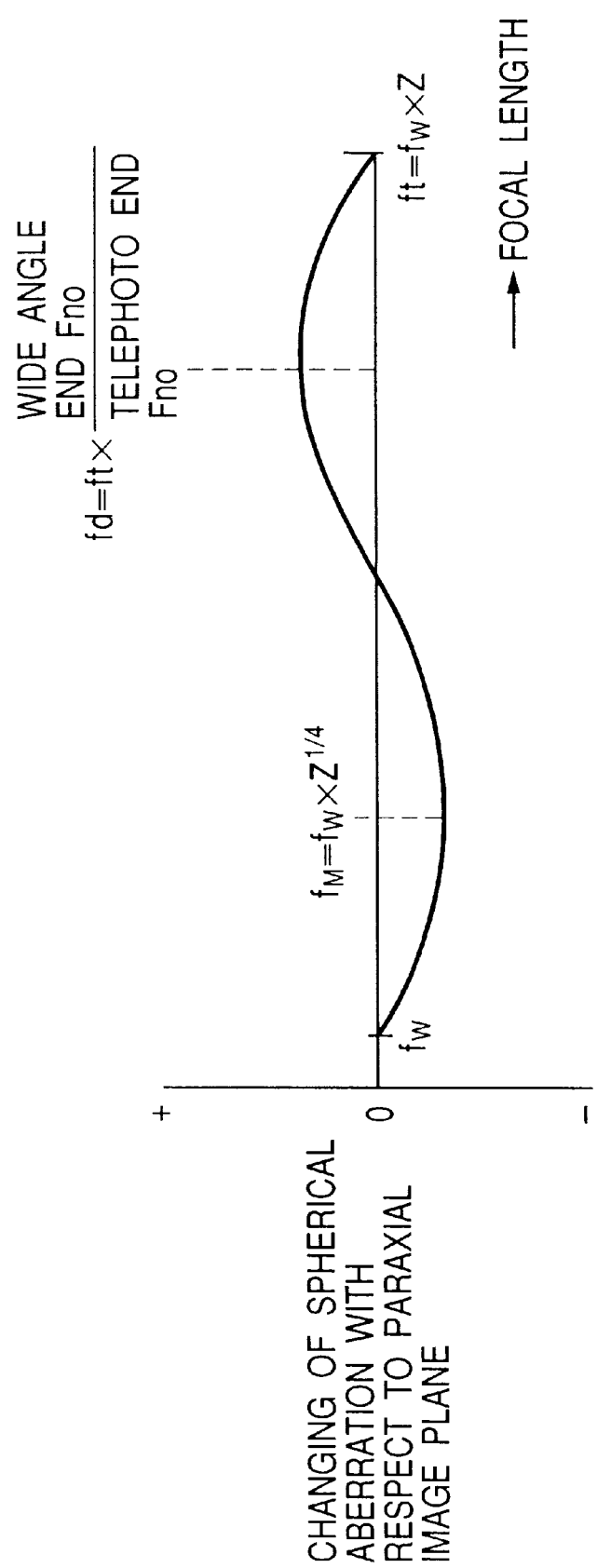
FIG. 33 is an illustration of the changing of an aberration resulting from the focal length change of a zoom lens.
Figure 34:
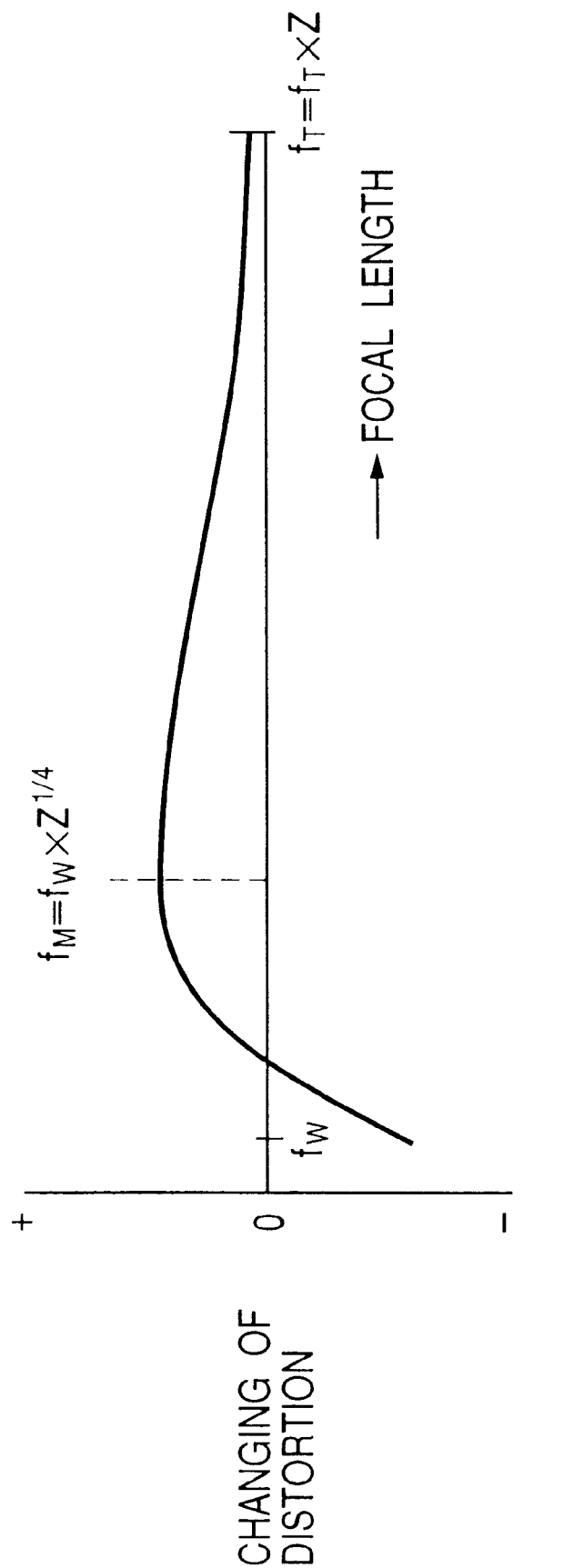
FIG. 34 is a distortion illustration of the changing of an aberration resulting from the focal length change of the zoom lens.

In a zoom lens wherein the wide angle end angle of view begins from $2\omega=58°-70°$ and the zoom ratio is of the order of 12 to 35 times, the incidence heights of an on-axis ray of light onto the front lens unit and the variator sequentially become higher from the wide angle end to the telephoto end as shown in FIGS. 25 to 28, and in a zoom lens wherein there is F drop, they become highest at an F drop starting position (a zoom position fd, FIG. 27). At the telephoto end, due to F drop, the incidence height becomes constant in the front lens unit, and becomes low in the variator.

In contrast, the incidence height of an off-axis ray of light passes fully the effective diameter of the variator at the wide angle end, but at a zoom position $fm=fw \times Z^{1/4}$, the incidence height in the front lens unit suddenly becomes high, and conversely the incidence height in the variator suddenly becomes low. This tendency becomes remarkable when a wider angle, a higher magnification and compactness and lighter weight are aimed at.

When an aspherical surface is provided in the front lens unit to thereby suppress the changing of aberrations, if an attempt is made to efficiently correct both of distortion which greatly changes on the wide angle side and spherical aberration which greatly changes on the telephoto side by a single aspherical surface, it will become very difficult. This is because between distortion and spherical aberration, due to the problem of their natures as aberrations, the aspherical shape for correcting them and the aspherical amount thereof differ greatly and therefore when an aspherical surface is provided with attention paid to one of the aberrations, it has a bad influence such as a high-order aberration upon the other aberration.

So, in the present embodiment, it is the greatest feature that in order to correct spherical aberration which influences by the cube of the incidence height of the on-axis ray of light, an aspherical surface AS1 is provided on at least one of the lens surfaces constituting the front lens unit in which the on-axis ray of light becomes highest in the entire variable power range which satisfies 0.95>hw/ht and 0.90>hw/hz, where ht is the maximum incidence height of the on-axis light beam, hw is the maximum incidence height of the off-axis light beam of a maximum angle of view at the wide angle end, and hz is the maximum incidence height of the off-axis light beam of a maximum angle of view at a zoom position at a variable power ratio $Z^{1/4}$.

This aspherical surface, when the aspherical surface for correcting the changing of spherical aberration on the telephoto side is applied onto a positive refracting surface in the front lens unit F, forms a shape in which positive refractive power becomes weaker toward the peripheral portion of the lens, and when the aspherical surface is provided on a negative refracting surface, forms a shape in which negative refractive power becomes stronger toward the peripheral portion of the lens, to thereby correct the spherical aberration near the telephoto end becoming under (minus), thereby suppressing well the changing of the spherical aberration on the telephoto side.

As an additional effect of this aspherical shape, it also becomes possible to suppress the over (plus) of distortion attributable to the fact that the off-axis incidence height in the front lens unit at the zoom position fm=fw×$Z^{1/4}$ suddenly becomes high, whereby the off-axis ray of light is strongly jumped up by the positive refractive power of the front lens unit.

Also, conversely speaking, this aspherical surface is a contrary effect regarding the distortion at the wide angle end, and under (minus) distortion attributable to the strong negative refractive power at the wide angle end is strongly jumped up by positive refractive power, whereby it becomes difficult to suppress distortion.

That is, the introduction of the aspherical surface AS1 into that lens surface of the front lens unit which satisfies 0.95>hw/ht and 0.9>hw/hz means that the maximum incidence height of the on-axis ray of light in the entire variable power range is higher than the incidence height of the off-axis light beam of the maximum angle of view at the wide angle end and the change in the incidence height of the off-axis ray of light of the maximum angle of view at the zoom position fm=fw×$Z^{1/4}$ is great, and well corrects the under spherical aberration at the telephoto end and the over distortion at the zoom position fm=fw×$Z^{1/4}$ and yet does not impart any bad influence to the under distortion at the wide angle end, and is very effective as the effect of this aspherical shape.

Further, in the present embodiment, in order to correct well the spherical aberration on the telephoto side by the wider angle, the aspherical shape of the front lens unit is made into a shape in which the central portion of the aspherical surface is a substantially spherical surface and the aspherical surface becomes larger in the peripheral portion thereof, so as to satisfy the aforementioned conditional expression (1).

The above-mentioned conditional expression (1) is for suppressing in the focal length changing system of the zoom lens, the distortion increasing action of the aspherical surface only in some zoom range of the entire zoom area which is near the wide angle end, and deriving the effect of correcting aberrations such as spherical aberration and distortion to the maximum in the other zoom areas.

Thus, in the present embodiment, the lens surface to which the aspherical surface is applied is appropriately set and the changing of the distortion on the wide angle side and the spherical aberration on the telephoto side is correct well, and high optical performance is obtained in the entire variable power range.

Further, in order to realize a zoom lens having a zoom ratio z of 10 times or greater (10<z) and having a large aperture in the entire zoom area, the present invention uses such a bright lens unit that satisfies conditional expression (2) as the front lens unit F. Thereby, the spherical aberration at the telephoto end is corrected well and yet the larger aperture and downsizing of the entire lens system are achieved at a time.

If the lower limit value of conditional expression (2) is exceeded, the sharing of aberrations of the front lens unit F on the telephoto side will suddenly increase and therefore, it will become difficult to correct the changing of spherical aberration well, and if the upper limit value of conditional expression (2) is exceeded, the larger aperture and downsizing of the entire lens system will become difficult.

Next, design is made such that the lateral magnification of the variator V satisfies conditional expression (3). Thereby, a predetermined variable power ratio is secured and yet the changing of aberrations is small over the entire variable power range and good optical performance is obtained.

If the lower limit value of conditional expression (3) is exceeded, a higher magnification will become difficult to obtain, and if the upper limit value of conditional expression (3) is exceeded, the sharing of aberration correction in the focal length changing system will suddenly increase and therefore, it will become difficult to reduce the changing of aberrations over the entire variable power range and obtain high optical performance.

Further, in the present embodiment, the front lens unit is comprised, in succession from the object side, of at least one negative lens and at least three positive lenses, and spherical aberration is caused to diverge by the negative lens and the principal point in the entire front lens unit is pushed out toward the object side to thereby achieve the higher performance and downsizing of the zoom lens and in addition, when the Abbe number of the negative lens is ν1n and the average value of the Abbe numbers of the three positive lenses is ν1p, the front lens unit satisfies conditional expression (4) to thereby make the achromatism chiefly on the telephoto side by a higher magnification sufficient.

For example, even if in order to correct well the achromatism in the front lens unit, an optical material of which the Abbe number exceeds 90 is partly used for the convex lens in the front lens unit, the achromatism of the entire front lens unit will not be easily improved. This is because the other convex lenses and concave lenses also need share the achromatism. Therefore, in the present embodiment, the achromatizing condition in the entire front lens unit is set as shown in conditional expression (4) by the use of the average of the Abbe numbers of the convex lenses constituting the front lens unit.

The features of each embodiment (numerical value embodiment) of the present invention will now be described.

Figure 1:
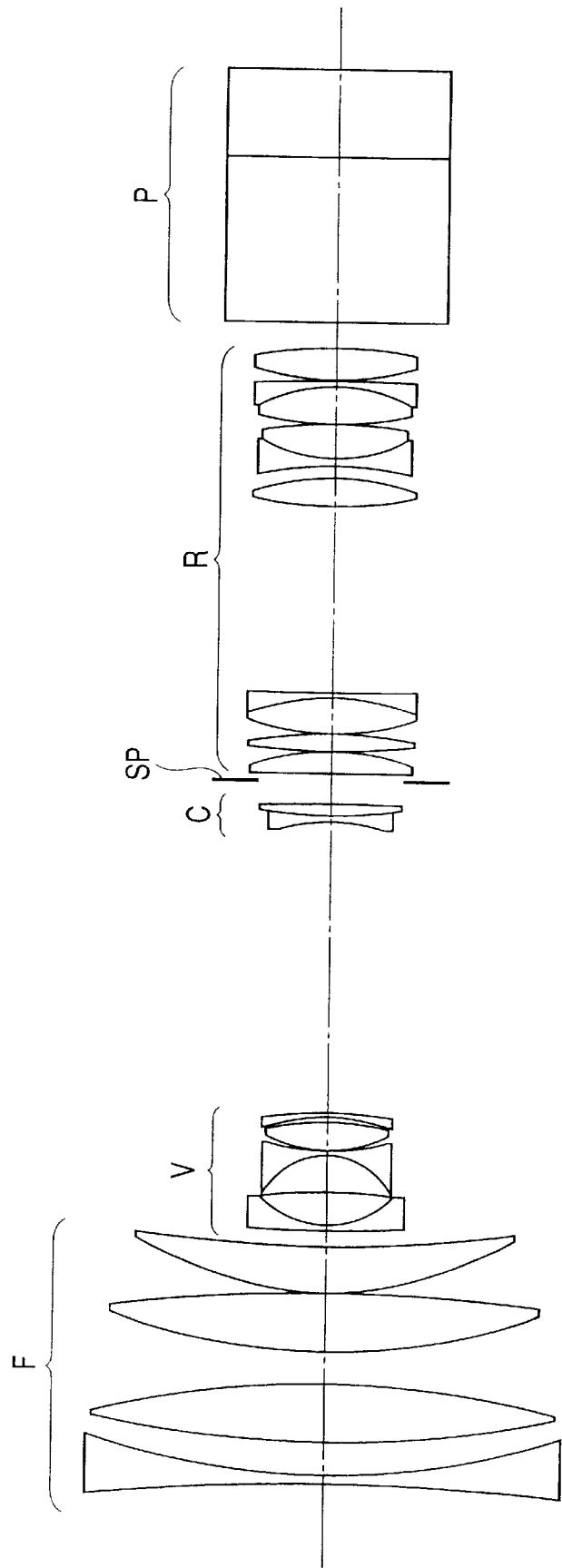
FIG. 1 is a lens cross-sectional view of the wide angle end of Numerical Value Embodiment 1 of the present invention.

Embodiment 1 shown in FIG. 1 has a zoom ratio of 20 times and the wide angle end angle of view 2ω thereof exceeds 69°. R1 to R8 designate a front lens unit F having positive refractive power for focusing. R9 to R17 denote a variator V monotonously movable to the image plane side from the wide (wide angle end) toward the tele (telephoto end). R18 to R20 designate a compensator C having the image point correcting action resulting from a focal length change, and having negative power (refractive power) and moved toward the object side so as to describe a convex arc during the focal length change from wide to tele. SP (R21) denotes a stop. R22 to R38 designate a relay lens unit R having the imaging action, and R39 to R41 designate a glass block equivalent to a color resolving prism.

In this Embodiment 1, when as the index of a large aperture, F number Fno. 1 is defined as Fno. 1=f1/(ft/Fno. t) in the front lens unit, the aperture is a large aperture of Fno. 1=1.09. For these large apertures, the front lens unit is comprised, in succession from the object side, of four concave, convex, convex and convex lenses, and spherical aberration is caused to diverge by the concave lens to thereby suppress the occurrence of spherical aberration in the front lens unit. Further, in order to correct well the achromatism in the front lens unit, an optical material of which the Abbe number exceeds 90 is partly used in the convex lenses of the front lens unit. However, if an optical material of which the Abbe number exceeds 90 is simply used for some of the convex lenses, the achromatism of the entire front lens unit will not be improved. Therefore, in the present embodiment, the Abbe number of the concave lens constituting the front lens unit is of the order of 25 and the average of the Abbe numbers of the convex lenses is of the order of 74, whereby the achromatism in the entire front lens unit is made good. At this time, the aforementioned conditional expression is |ν1n−ν1p|=48.5.

As regards the lateral magnification β2w of the variator V at the wide angle end, the zoom ratio is 20 times and therefore, the absolute value of the lateral magnification is β2w=−0.255. The variator V is comprised, in succession from the object side, of a concave lens having its sharp concave surface facing the image plane side, a convex lens of a relatively small Abbe number, a concave lens, a convex lens of a relatively small refractive index, and a concave lens, to thereby suppress the occurrence of distortion, spherical aberration and coma in the variator and also effectively correct the changing of chromatic aberration.

The aspherical surface in the front lens unit is applied onto a surface R5, and efficiently corrects the under spherical aberration at the telephoto end in the front lens unit and the over distortion at the zoom position fm=fw×$Z^{1/4}$ at the same time. At this time, it effectively utilizes that the maximum incidence height of the on-axis ray of light in the entire variable power range is higher than the incidence height of the off-axis ray of light of the maximum angle of view at the wide angle end and the change in the incidence height of the off-axis ray of light of the maximum angle of view at the wide angle end and the zoom position fm=fw×$Z^{1/4}$ is great, and hw/ht=0.781 and hw/hz=0.745. The direction of the aspherical surface is a direction in which positive power becomes weaker as the amount of separation from the optical axis becomes greater, and in order to correct spherical aberration and distortion efficiently up to a high-order area, up to aspherical surface coefficients B, C, D and E are used. The aspherical amount at this time is 302.4 μm at the maximum height of the incident ray of light on R5.

Also, an aspherical surface is applied onto a surface R9 in the variator, and corrects the under distortion near the wide angle end particularly by the utilization of the fact that the off-axis ray of light passes only near the wide angle end. The direction of the aspherical surface is a direction in which positive power becomes stronger as the amount of separation from the optical axis becomes greater, and in order to correct distortion efficiently up to a high-order area, up to aspherical surface coefficients B, C, D and E are used. The aspherical amount at this time is 168.4 μm at the maximum height of the incident ray of light on R9.

FIGS. 5A to 5C to FIGS. 9A to 9C show spherical aberration, astigmatism and distortion at respective zoom positions.

Figure 2:
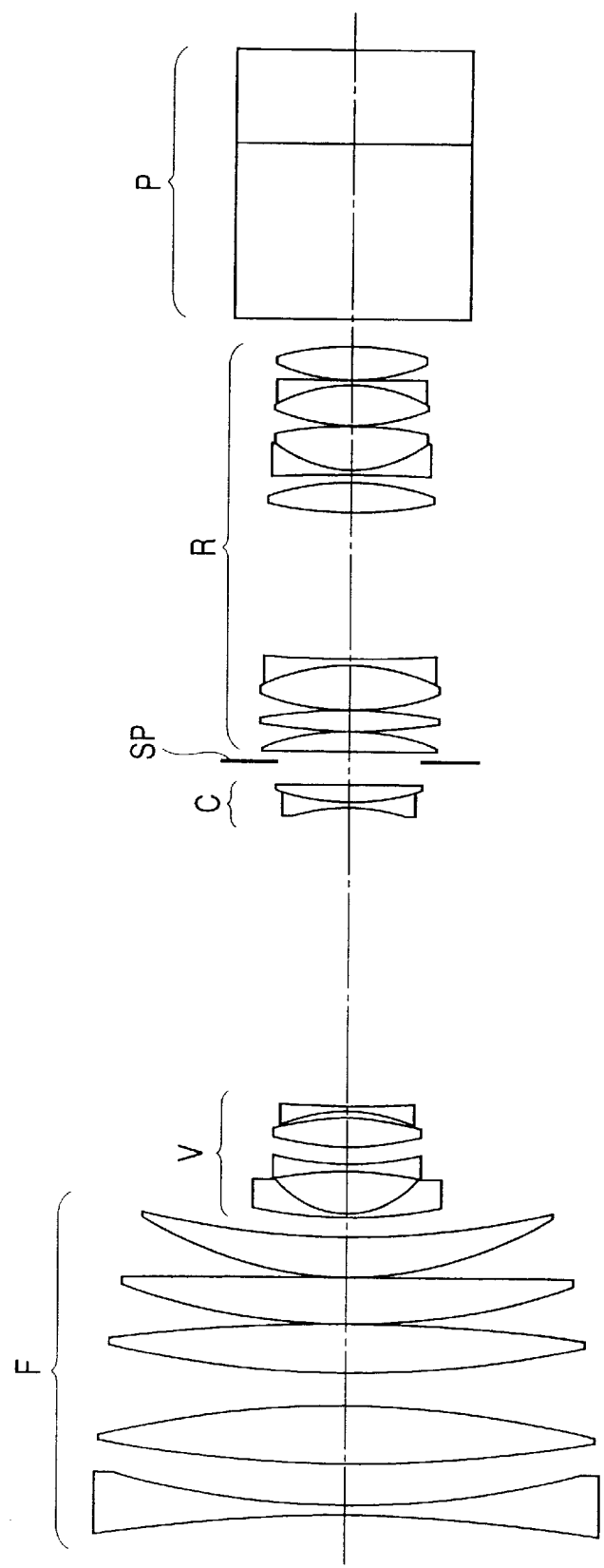
FIG. 2 is a lens cross-sectional view of the wide angle end of Numerical Value Embodiment 2 of the present invention.

Embodiment 2 shown in FIG. 2 has a zoom ratio of 15 times and the wide angle end angle of view 2ω thereof exceeds 65°. R1 to R10 designate a front lens unit having positive refractive power for focusing. R11 to R18 denote a variator V monotonously movable toward the image plane side from wide (wide angle end) to tele (telephoto end) for focal length change. R19 to R21 designate the same compensation C having the image point correcting action resulting from a focal length change, and having negative power (refractive power) and movable toward the object side so as to describe a convex arc during the focal length change from wide to tele. SP (R22) denotes a stop. R23 to R39 designate a relay lens unit R having the imaging action, and R40 to R42 denote a glass block equivalent to a color resolving prism.

In this Embodiment 2, when as the index of a large aperture, F-number Fno. 1 is defined as Fno. 1=f1/(ft/Fno. t) n the front lens unit, the aperture is a large aperture of Fno. 1=1.10. For these large apertures, the front lens unit is comprised, in succession from the object side, of five concave, convex, convex, convex and convex lenses, and spherical aberration is caused to diverge by the concave lens to thereby suppress the occurrence of spherical aberration in the front lens unit. Further, in order to correct well the achromatism in the front lens unit, optical material of which the Abbe number exceeds 80–90 is partly used in the convex lenses of the front lens unit. However, if an optical material of which the Abbe number exceeds 80–90 is simply used for some of the convex lenses, the achromatism of the entire front lens unit will not be improved. Therefore, in the present embodiment, the Abbe number of the concave lens constituting the front lens unit is of the order of 25 and the average of the Abbe numbers of the convex lenses is of the order of 74, whereby the achromatism in the entire front lens unit is made good. At this time, the aforementioned conditional expression is |ν1n−ν1p|=48.9.

As regards the lateral magnification β2w of the variator V at the wide angle end, the zoom ratio is 15 times and therefore, the absolute value of the lateral magnification is β2w=−0.291. The variator V is comprised, in succession from the object side, of a concave lens having its sharp concave surface facing the image plane side, a convex lens and concave lens, to thereby suppress the occurrence of distortion, spherical aberration and coma in the variator and also correct the changing of chromatic aberration effectively.

The aspherical surface in the front lens unit is applied onto a surface R5, and efficiently corrects the under spherical aberration at the telephoto end in the front lens unit and the over distortion at the zoom position fm=fw×$Z^{1/4}$ at a time. At this time, it effectively utilizes the fact that the maximum incidence height of the on-axis ray of light in the entire variable power range is higher than the incidence height of the off-axis ray of light of the maximum angle of view at the wide angle end and the change in the incidence height of the off-axis ray of light of the maximum angle of view at the wide angle end and the zoom position fm=fw×$Z^{1/4}$ is great, and hw/ht=0.901 and hw/hz=0.853.

The direction of the aspherical surface is a direction in which positive power becomes weaker as the amount of separation from the optical axis becomes greater, and in order to correct spherical aberration and distortion efficiently up to a high-order area, up to aspherical surface coefficients B, C, D and E are used. The aspherical amount at this time is 29.7 μm at the maximum height of the incident ray of light on R5.

Also, an aspherical surface is provided on a surface R18 in the variator, and corrects the under distortion near the wide angle end particularly by the utilization of the fact that the off-axis ray of light passes only near the wide angle end, and also suppresses the diverging action of spherical aberration in the variator. The direction of the aspherical surface is a direction in which positive power becomes stronger as the amount of separation from the optical axis becomes greater, and in order to correct distortion and spherical aberration efficiently up to a high-order area, up to aspherical surface coefficients B, C, D and E are used. The aspherical amount at this time is 102.3 μm at the maximum height of the incident ray of light on R18.

FIGS. 10A to 10C to FIGS. 14A to 14C show spherical aberration, astigmatism and distortion at respective zoom positions.

Figure 3:
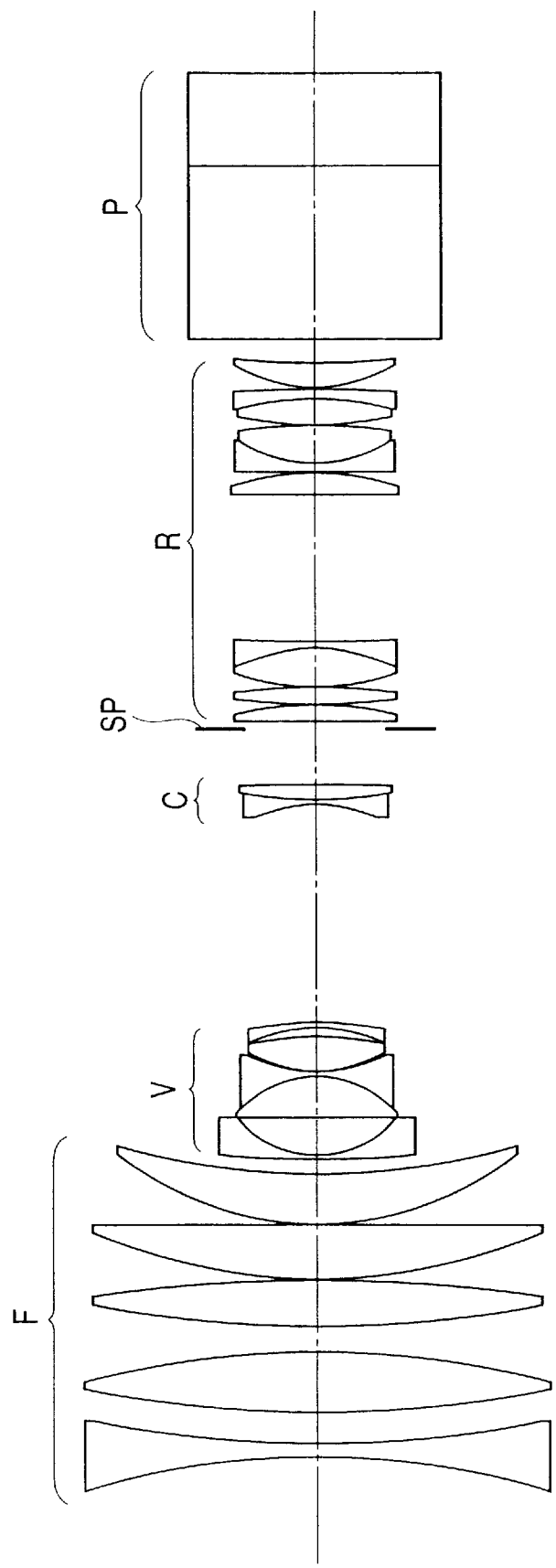
FIG. 3 is a lens cross-sectional view of the wide angle end of Numerical Value Embodiment 3 of the present invention.

Embodiment 3 shown in FIG. 3 has a zoom ratio of 12 times, and the wide angle end angle of view 2ω thereof exceeds 62°. R1 to R10 designate a front lens unit F having positive refractive power for focusing. R11 to R19 denotes a variator V monotonously movable toward the image plane side from wide (wide angle end) to tele (telephoto end) for focal length change. R20 to R22 designate a compensator having the image point correcting action resulting from a focal length change and having negative power (refractive power), and movable toward the object side so as to describe a convex arc during the focal length change from wide to tele. SP (R23) denotes a stop. R24 to R40 designate a relay lens unit R having the imaging action, and R41 to R43 denotes a glass block equivalent to a color resolving prism.

In this Embodiment 3, when as the index of a large aperture, F-number Fno. 1 is defined as Fno. 1=f1/(ft/Fno. t) in the front lens unit, the aperture is a large aperture of Fno. 1=0.866. For these large apertures, the front lens unit is comprised, in succession from the object side, of five concave, convex, convex, convex and convex lenses, and spherical aberration is caused to diverge by the concave lens to thereby suppress the occurrence of spherical aberration in the front lens unit. Further, in order to correct well the achromatism in the front lens unit, an optical material of which the Abbe number exceeds 80 is partly used in the convex lenses of the front lens unit. However, if an optical material of which the Abbe number exceeds 80 is simply used for some of the convex lenses, the achromatism of the entire front lens unit will not be improved. Therefore, in the present embodiment, the Abbe number of the concave lens constituting the front lens unit is of the order of 25 and the average of the Abbe numbers of the convex lenses is of the order of 71, whereby the achromatism in the entire front lens unit is made good. At this time, the aforementioned conditional expression is $|v1n-v1p|=45.5$.

As regards the lateral magnification $\beta 2w$ of the variator V at the wide angle end, the zoom ratio is 12 times and therefore, the absolute value of the lateral magnification is relatively great, namely, $\beta 2w=-0.429$. The variator V is comprised, in succession from the object side, of a concave lens of a shape having its sharp concave surface facing the image plane side, a convex lens of a relatively small Abbe number, a concave lens, a convex lens of a relatively small refractive index, and a concave lens, to thereby suppress the occurrence of distortion, spherical aberration and coma in the variator and also correct the changing of chromatic aberration effectively.

The aspherical surface in the front lens unit is applied onto a surface R9, and efficiently corrects the under spherical aberration at the telephoto end in the front lens unit and the over distortion at the zoom position $fm=fw \times Z^{1/4}$ at a time. At this time, it effectively utilizes the fact that the maximum incidence height of the on-axis ray of light in the entire variable power range is higher than the incidence height of the off-axis ray of light of the maximum angle of view at the wide angle end and the change in the incidence height of the off-axis ray of light of the maximum angle of view at the wide angle end and the zoom position $fm=fw \times Z^{1/4}$ is great, and hw/ht=0.669 and hw/hz=0.786.

The direction of the aspherical surface is a direction in which positive power becomes weaker as the amount of separation from the optical axis becomes greater, and in order to correct spherical aberration and distortion efficiently up to a high-order area, up to aspherical surface coefficients B, C, D and E are used. The aspherical amount at this time is 241.4 $\mu$m at the maximum height of the incident ray of light on R9.

Also, an aspherical surface is applied onto a surface R11 in the variator, and corrects the under distortion near the wide angle end particularly by the utilization of the fact that the off-axis ray of light passes only near the wide angle end. The direction of the aspherical surface is a direction in which positive power becomes stronger as the amount of separation from the optical axis becomes greater, and in order to correct distortion efficiently up to a high-order area, up to aspherical surface coefficients B, C, D and E are used. The aspherical amount at this time is 651.2 $\mu$m at the maximum height of the incidence ray of light on R11.

FIGS. 15A to 15C to FIGS. 19A to 19C show spherical aberration, astigmatism and distortion at respective zoom positions.

Figure 4:
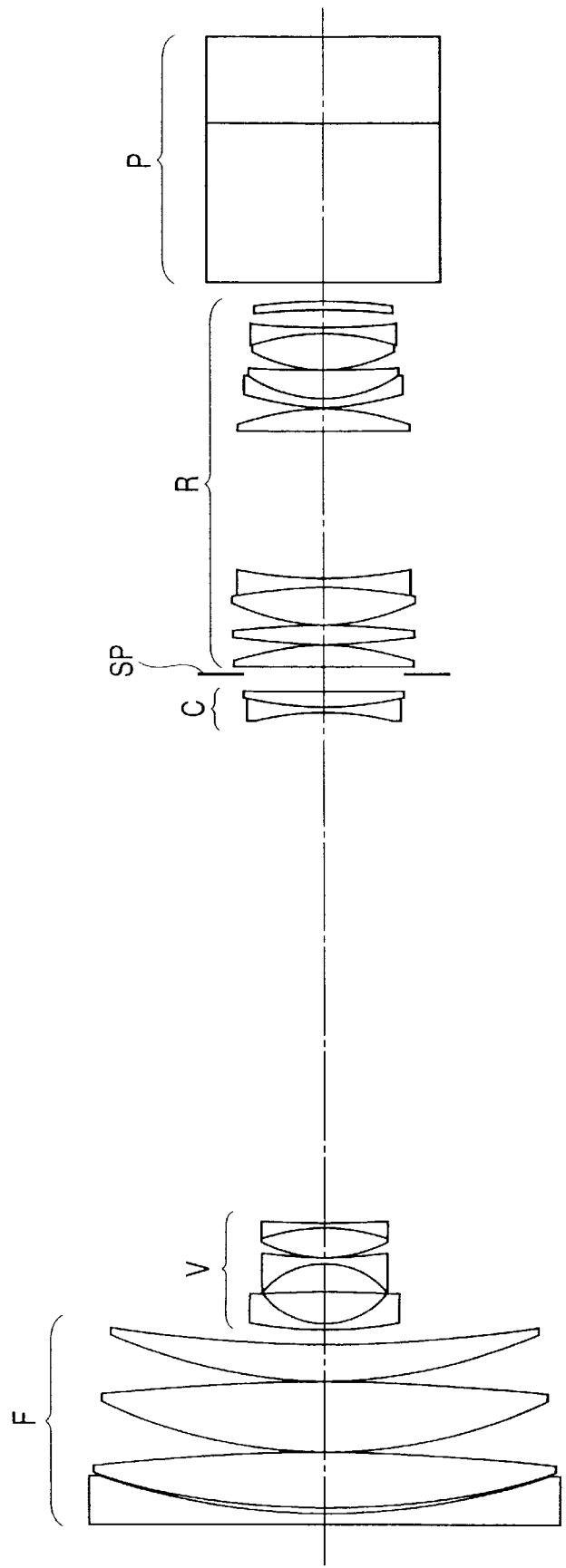
FIG. 4 is a lens cross-sectional view of the wide angle end of Numerical Value Embodiment 4 of the present invention.
Figure 13A:
FIGS. 13A, 13B and 13C show the aberrations of Embodiment 2 of the present invention at a focal length f=108.4.
Figure 13B:
Figure 13C:
Figures 14A, 14B, 14C:
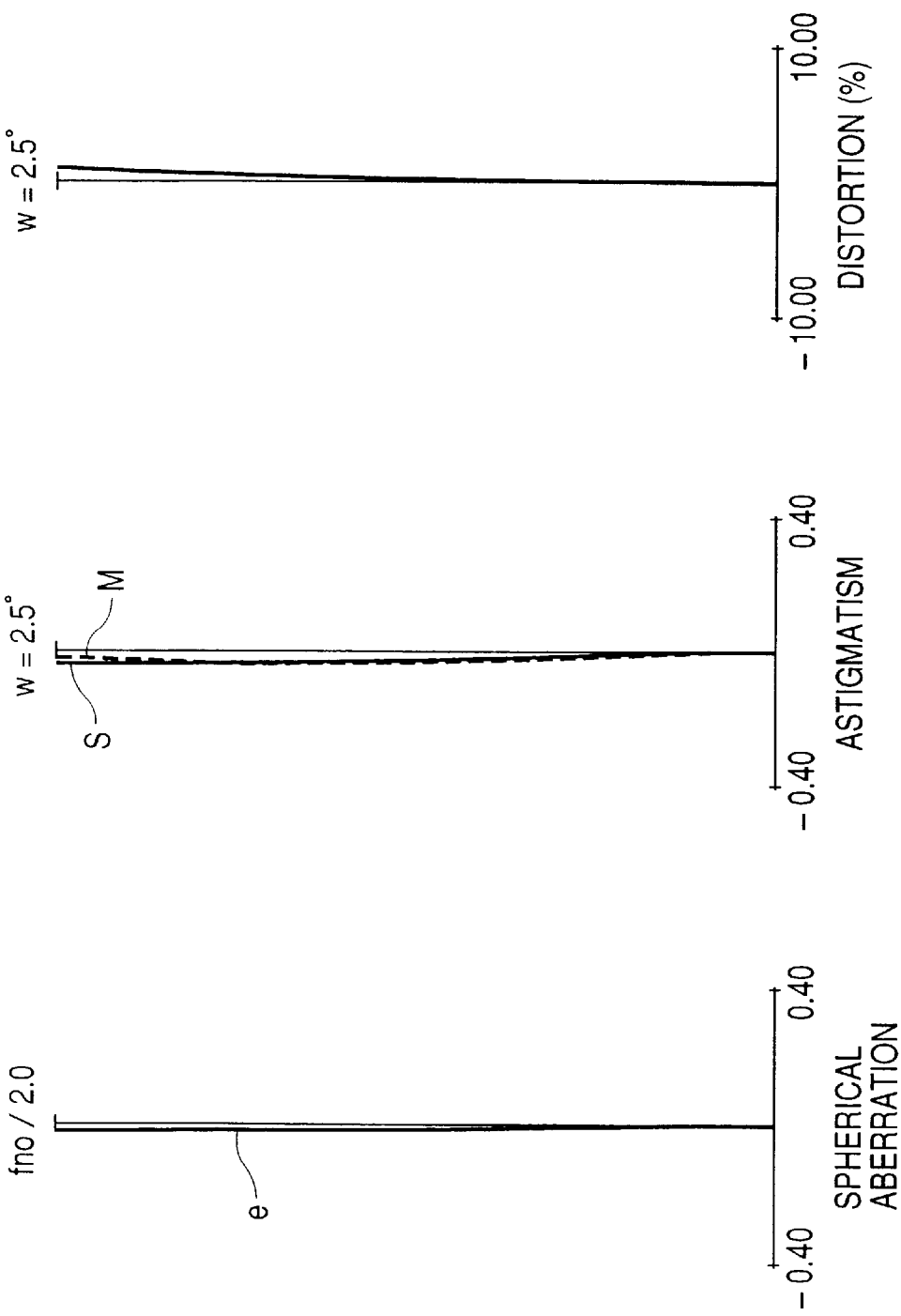
FIGS. 14A, 14B and 14C show the aberrations of Embodiment 2 of the present invention at a focal length f=127.5.
Figure 25:
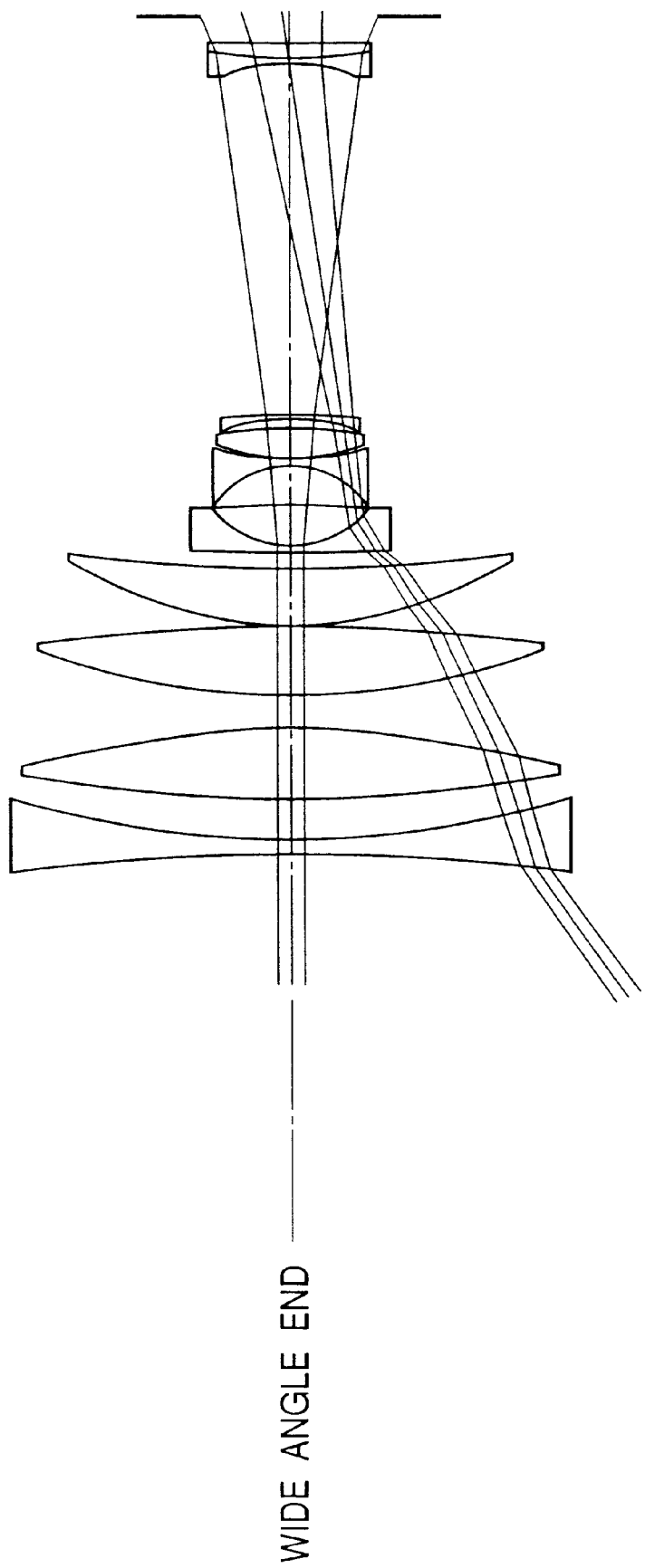
FIG. 25 shows the optical path of a portion of FIG. 1.
Figure 26:
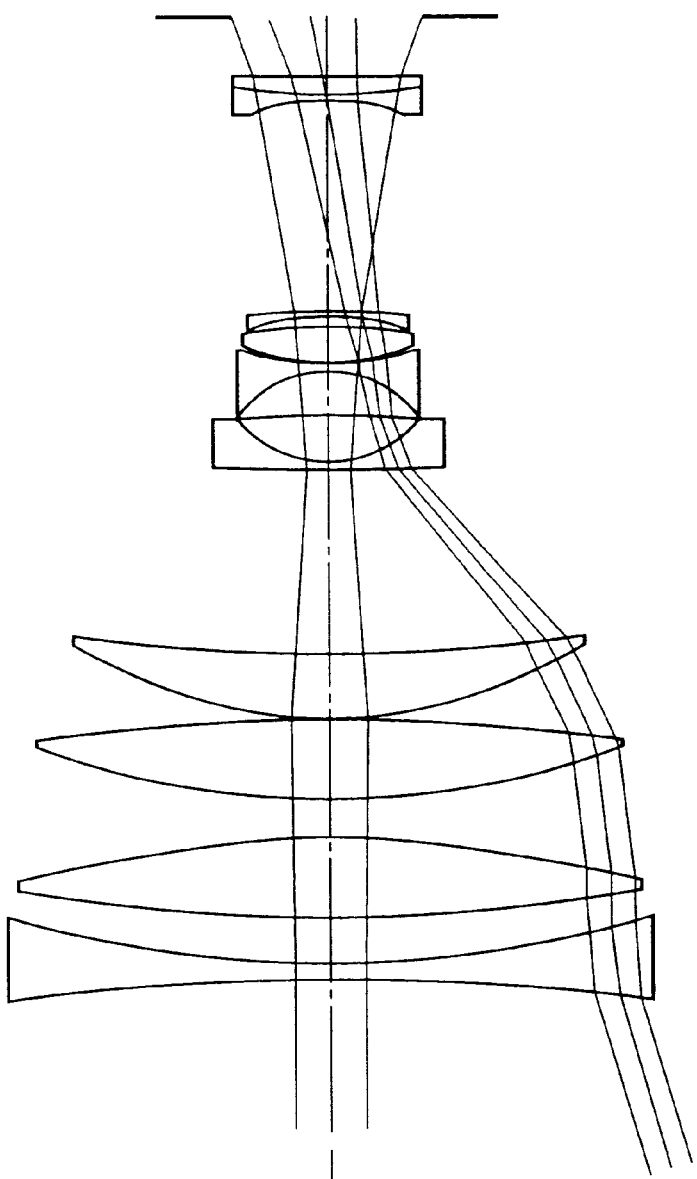
FIG. 26 shows the optical path of a portion of FIG. 1.

Embodiment 4 shown in FIG. 4 has a zoom ratio of 35 times, and the wide angle end angle of view $2\omega$ thereof exceeds 57°. R1 to R8 designates a front lens unit F having positive refractive power for focusing. R9 to R16 denote a variator V monotonously movable toward the image plane side from wide (wide angle end) to tele (telephoto end) for focal length change. R17 to R19 designate a compensator C having the image point correcting action resulting from a focal length change and having negative power (refractive power), and movable toward the object side so as to describe a convex arc during the focal length change from wide to tele. SP (R20) denotes a stop. R21 to R37 designate a relay lens unit R having the imaging action, and R38 to R40 denote a glass block equivalent to a color resolving prism.

In this Embodiment 4, when as the index of a large aperture F-number Fno. 1 is defined as Fno. 1=f1/(ft/Fno. t) in the front lens unit, the aperture is a large aperture of Fno. 1=1.52. For these large apertures, the front lens unit is comprised, in succession from the object side, of four concave, convex, convex and convex lenses, and spherical aberration is caused to diverge by the concave lens to thereby suppress the occurrence of spherical aberration in the front lens unit. Further, in order to correct well the achromatism in the front lens unit, an optical material of which the Abbe number exceeds 90 is partly used in the convex lenses of the front lens unit. However, if an optical material of which the Abbe number exceeds 90 is simply used for some of the convex lenses, the achromatism of the entire front lens unit is not improved. Therefore, in the present embodiment, the Abbe number of the concave lens constituting the front lens unit is of the order of 37, but the average of the Abbe numbers of the convex lenses is of the order of 82, whereby the achromatism in the entire front lens unit is made good. At this time, the aforementioned conditional expression is $|v1n-v1P|=45.0$.

As regards the lateral magnification $\beta 2w$ of the variator at the wide angle end, the zoom ratio is 35 times and therefore, the absolute value of the lateral magnification is relatively small, namely, $\beta 2w=-0.182$. The variator V is comprised, in succession from the object side, of a concave lens of a shape having its sharp concave surface facing the image plane side, a convex lens of a relatively small Abbe number, a concave lens, a convex lens of a relatively small refractive index, and a concave lens, to thereby suppress the occurrence of distortion, spherical aberration and coma in the variator and also corrects the changing of chromatic aberration effectively.

In this Numerical Value Embodiment 4, as shown in FIGS. 29 to 32, by the appropriate power arrangement thereof, all the lens surfaces constituting the front lens unit in the entire variable power range satisfy the aforementioned aspherical surface introducing conditions 0.95>hw/ht and 0.90>hw/hz. Therefore, the aspherical surfaces in the front lens unit are applied onto a surface R1 and a surface R7 to thereby efficiently correct the under spherical aberration at the telephoto end in the front lens unit and the over distortion at the zoom position $fm=fw \times Z^{1/4}$ at a time. At this time, it is effectively utilized that the maximum incidence height of the on-axis ray of light in the entire variable power range is higher than the incidence height of the off-axis light beam of the maximum angle of view at the wide angle end and the change in the incidence height of the off-axis ray of light of the maximum angle of view at the wide angle end and the zoom position fm=fw×$Z^{1/4}$ is great, and hw/ht=0.506 and hw/hz=0.547.

As regards the directions of the aspherical surfaces, the direction of the aspherical surface on the surface R1 is a direction in which negative power becomes stronger as the amount of separation from the optical axis becomes greater, and the direction of the aspherical surface on the surface R7 is a direction in which positive power becomes weaker as the amount of separation from the optical axis becomes greater, and both aspherical surfaces use up to aspherical surface coefficients B, C, D and E in order to correct spherical aberration and distortion efficiently up to a high-order area. The aspherical amounts at this time are 54.5 μm and 239.9 μm at the maximum heights of the incident rays of light on R1 and R7, respectively.

FIGS. 20A to 20C to FIGS. 24A to 24C show spherical aberration, astigmatism and distortion at respective zoom positions.

Some numerical value embodiments of the present invention will be shown below. In the numerical value embodiments, R1 represents the radius of curvature of the ith lens surface from the object side, Di represents the thickness and air space of the ith lens from the object side, and Ni and vi represent the refractive index and Abbe number, respectively, of the material of the ith lens from the object side.

When the direction of the optical axis is the X-axis and the direction perpendicular to the optical axis is the H-axis and the direction of travel of light is positive and R is the paraxial radius of curvature and k, B, C, D and E are aspherical surface coefficients, the aspherical shape is represented by the following expression:

$$x = \frac{H^2/R}{1+\sqrt{1-(1+k)(H/R)^2}} + BH^4 + CH^6 + DH^8 + EH^{10}$$

(Numerical Value Embodiment 1)
f = 8.0 to 160.0   fno = 1.8 to 2.5   2w = 69° to 3.9°

|  | | | | | | |
|---|---|---|---|---|---|---|
|  | r 1 = | −398.617 | d 1 = | 2.00 | n 1 = 1.81265 | v 1 = 25.4 |
|  | r 2 = | 138.411 | d 2 = | 5.88 | | |
|  | r 3 = | 190.482 | d 3 = | 11.07 | n 2 = 1.43985 | v 2 = 95.0 |
|  | r 4 = | −158.221 | d 4 = | 6.95 | | |
| aspherical | r 5 = | 104.571 | d 5 = | 10.45 | n 3 = 1.62033 | v 3 = 63.3 |
| surface | r 6 = | −361.269 | d 6 = | 0.20 | | |
|  | r 7 = | 61.616 | d 7 = | 8.76 | n 4 = 1.62033 | v 4 = 63.3 |
|  | r 8 = | 240.012 | d 8 = variable | | | |
| aspherical | r 9 = | 623.406 | d 9 = | 0.80 | n 5 = 1.88815 | v 5 = 40.8 |
| surface | r10 = | 15.320 | d10 = | 5.99 | | |
|  | r11 = | −120.427 | d11 = | 6.55 | n 6 = 1.81264 | v 6 = 25.4 |
|  | r12 = | −13.787 | d12 = | 0.80 | n 7 = 1.77621 | v 7 = 49.6 |
|  | r13 = | 31.762 | d13 = | 0.20 | | |
|  | r14 = | 23.275 | d14 = | 4.97 | n 8 = 1.57047 | v 8 = 42.8 |
|  | r15 = | −66.697 | d15 = | 1.11 | | |
|  | r16 = | −28.678 | d16 = | 0.80 | n 9 = 1.88815 | v 9 = 40.8 |
|  | r17 = | −58.591 | d17 = variable | | | |
|  | r18 = | −30.127 | d18 = | 0.80 | n10 = 1.82017 | v10 = 46.6 |
|  | r19 = | 69.206 | d19 = | 2.34 | n11 = 1.93306 | v11 = 21.3 |
|  | r20 = | −290.396 | d20 = variable | | | |
|  | r21 = | (stop) | d21 = | 1.30 | | |
|  | r22 = | 766.570 | d22 = | 4.10 | n12 = 1.62286 | v12 = 60.3 |
|  | r23 = | −42.080 | d23 = | 0.15 | | |
|  | r24 = | 148.919 | d24 = | 3.22 | n13 = 1.52033 | v13 = 58.9 |
|  | r25 = | −90.383 | d25 = | 0.15 | | |
|  | r26 = | 61.396 | d26 = | 6.60 | n14 = 1.52033 | v14 = 58.9 |
|  | r27 = | −35.780 | d27 = | 1.15 | n15 = 1.79012 | v15 = 44.2 |
|  | r28 = | 698.727 | d28 = | 34.00 | | |
|  | r29 = | 79.382 | d29 = | 5.22 | n16 = 1.51825 | v16 = 64.1 |
|  | r30 = | −47.920 | d30 = | 2.24 | | |
|  | r31 = | −86.685 | d31 = | 1.15 | n17 = 1.80401 | v17 = 42.2 |
|  | r32 = | 25.952 | d32 = | 6.44 | n18 = 1.52032 | v18 = 59.0 |
|  | r33 = | −144.488 | d33 = | 0.15 | | |
|  | r34 = | 59.870 | d34 = | 6.98 | n19 = 1.48915 | v19 = 70.2 |
|  | r35 = | −27.698 | d35 = | 1.15 | n20 = 1.81078 | v20 = 40.9 |
|  | r36 = | −219.881 | d36 = | 0.15 | | |
|  | r37 = | 48.862 | d37 = | 5.74 | n21 = 1.52032 | v21 = 59.0 |
|  | r38 = | −55.798 | d38 = | 4.50 | | |
|  | r39 = | ∞ | d39 = | 30.00 | n22 = 1.60718 | v22 = 38.0 |
|  | r40 = | ∞ | d40 = | 16.20 | n23 = 1.51825 | v23 = 64.2 |
|  | r41 = | ∞ | | | | |

TABLE 1

| Variable | Focal length | | | | |
|---|---|---|---|---|---|
| spacing | 8.00 | 16.92 | 48.00 | 115.20 | 160.00 |
| d 8 | 0.80 | 23.10 | 41.56 | 49.92 | 51.77 |
| d17 | 53.41 | 27.52 | 6.51 | 3.44 | 6.19 |
| d20 | 4.50 | 8.08 | 10.63 | 5.34 | 0.74 |

Aspherical Lens Shape
surface R5

| reference spherical surface R = 104.571 | aspherical amount (R5) | h | Δ |
|---|---|---|---|
| aspherical | 70% | (26.97mm) | 70.0 μm |
| coefficient | 90% | (34.67mm) | 195.6 μm |
| $k = 2.258 \times D^{-1}$ | 100% | (38.53mm) | 302.4 μm |

TABLE 1-continued $B = -1.034 \times D^{-7}$      $|\Delta 10/f1| = 4.320 \times 10^{-3}$
$C = 3.972 \times D^{-12}$      $|\Delta 9/f1| = 2.795 \times 10^{-3}$
$D = 4.819 \times D^{-16}$      $|\Delta 7/f1| = 1.060 \times 10^{-3}$
$E = -3.114 \times D^{-19}$ surface R9

| reference spherical surface R =623.406 | Zoom parameter |
|---|---|
| aspherical coefficient | Fno. 1 = 1.09 |
|  | β2w = −0.255 |
| $k = 1.561 \times D^{-3}$ | $|\nu 1n - \nu 1p| = 48.5$ |
| $B = 7.730 \times D^{-6}$ | hw/ht = 0.781 |
| $C = -3.619 \times D^{-8}$ | hw/hz = 0.745 |
| $D = 1.176 \times D^{-10}$ | |
| $E = -2.852 \times D^{-13}$ | |

(Numerical Value Embodiment 2)
f = 8.5 to 127.5   fno = 1.7 to 2.0   2w = 65.8° to 4.9°

|  |  |  |  |  |  |
|---|---|---|---|---|---|
|  | r 1 = | −244.102 | d 1 = | 2.00 n 1 = 1.81265 | ν 1 = 25.4 |
|  | r 2 = | 158.001 | d 2 = | 7.15 |  |
|  | r 3 = | 248.421 | d 3 = | 9.83 n 2 = 1.43985 | ν 2 = 95.0 |
|  | r 4 = | −162.011 | d 4 = | 7.23 |  |
| aspherical surface | r 5 = | 169.967 | d 5 = | 8.29 n 3 = 1.49845 | ν 3 = 81.5 |
|  | r 6 = | −334.274 | d 6 = | 0.20 |  |
|  | r 7 = | 116.489 | d 7 = | 7.61 n 4 = 1.62286 | ν 4 = 60.3 |
|  | r 8 = | −2771.455 | d 8 = | 0.20 |  |
| aspherical surface | r 9 = | 63.214 | d 9 = | 7.01 n 5 = 1.62286 | ν 5 = 60.3 |
|  | r10 = | 147.412 | d10 = variable |  |  |
|  | r11 = | 74.395 | d11 = | 0.80 n 6 = 1.83945 | ν 6 = 42.7 |
|  | r12 = | 16.628 | d12 = | 7.63 |  |
|  | r13 = | −49.291 | d13 = | 0.80 n 7 = 1.77621 | ν 7 = 49.6 |
|  | r14 = | 59.918 | d14 = | 2.70 |  |
|  | r15 = | 42.118 | d15 = | 5.61 n 8 = 1.85501 | ν 8 = 23.9 |
|  | r16 = | −33.757 | d16 = | 1.23 |  |
|  | r17 = | −24.733 | d17 = | 0.80 n 9 = 1.77621 | ν 9 = 49.6 |
|  | r18 = | 118.870 | d18 = variable |  |  |
|  | r19 = | −28.022 | d19 = | 0.80 n10 = 1.77621 | ν10 = 49.6 |
|  | r20 = | 39.558 | d20 = | 2.87 n11 = 1.85501 | ν11 = 23.9 |
|  | r21 = | −1317.486 | d21 = variable |  |  |
|  | r22 = | (stop) | d22 = | 2.00 |  |
|  | r23 = | −183.995 | d23 = | 3.75 n12 = 1.62286 | ν12 = 60.3 |
|  | r24 = | −37.732 | d24 = | 0.15 |  |
|  | r25 = | 114.677 | d25 = | 3.02 n13 = 1.51976 | ν13 = 52.4 |
|  | r26 = | −147.958 | d26 = | 0.15 |  |
|  | r27 = | 38.367 | d27 = | 7.89 n14 = 1.51976 | ν14 = 52.4 |
|  | r28 = | −37.297 | d28 = | 1.15 n15 = 1.79012 | ν15 = 44.2 |
|  | r29 = | 372.464 | d29 = | 25.00 |  |
|  | r30 = | 80.115 | d30 = | 5.23 n16 = 1.51825 | ν16 = 64.1 |
|  | r31 = | −47.881 | d31 = | 1.22 |  |
|  | r32 = | −148.415 | d32 = | 1.15 n17 = 1.83945 | ν17 = 42.7 |
|  | r33 = | 23.676 | d33 = | 7.22 n18 = 1.50349 | ν18 = 56.4 |
|  | r34 = | −77.651 | d34 = | 0.15 |  |
|  | r35 = | 36.972 | d35 = | 7.27 n19 = 1.48915 | ν19 = 70.2 |
|  | r36 = | −28.179 | d36 = | 1.15 n20 = 1.83932 | ν20 = 37.2 |
|  | r37 = | 265.720 | d37 = | 0.15 |  |
|  | r38 = | 40.982 | d38 = | 5.67 n21 = 1.48915 | ν21 = 70.2 |
|  | r39 = | −49.496 | d39 = | 4.50 |  |
|  | r40 = | ∞ | d40 = | 30.00 n22 = 1.60718 | ν22 = 38.0 |
|  | r41 = | ∞ | d41 = | 16.20 n23 = #.51825 | ν23 = 64.2 |
|  | r42 = | ∞ |  |  |  |

TABLE 2

| Variable | Focal length | | | | |
|---|---|---|---|---|---|
| spacing | 8.50 | 17.00 | 51.00 | 108.38 | 127.50 |
| d10 | 1.23 | 21.80 | 41.49 | 48.94 | 50.03 |
| d18 | 51.71 | 28.49 | 7.37 | 4.83 | 5.73 |
| d21 | 4.00 | 6.65 | 8.08 | 3.16 | 1.18 |

Aspherical Lens Shape
surface R5

| reference spherical surface R =169.967 | aspherical amount (R5) | h | Δ |
|---|---|---|---|
| aspherical coefficient | 70% | (27.68mm) | 7.6 μm |
| | 90% | (35.58mm) | 19.6 μm |
| $k = 1.799 \times D^0$ | 100% | (39.54mm) | 29.7 μm |

TABLE 2-continued $B = -5.947 \times D^{-8}$   $|\Delta 10/f1| = 4.237 \times 10^{-4}$
$C = -3.462 \times D^{-12}$   $|\Delta 9/f1| = 2.798 \times 10^{-4}$
$D = 2.547 \times D^{-15}$   $|\Delta 7/f1| = 1.084 \times 10^{-4}$
$E = -1.186 \times D^{-18}$
surface R18

| reference spherical surface R = 118.870 | Zoom parameter Fno.1 = 1.10 |
|---|---|
| aspherical coefficient | $\beta 2w = -0.291$ |
| $k = -6.054 \times D^1$ | $|\nu 1n - \nu 1p| = 48.9$ |
| $B = -3.099 \times D^{-6}$ | hw/ht = 0.901 |
| $C = -6.745 \times D^{-10}$ | hw/hz = 0.853 |
| $D = -5.509 \times D^{-11}$ | |
| $E = -1.583 \times D^{-13}$ | |

(Numerical Value Embodiment 3)
f = 9.0 to 108.0   fno = 1.7   2w = 62.9° to 5.8°

| | | | | | | |
|---|---|---|---|---|---|---|
| | r 1 = | −122.883 | d 1 = | 2.30 | n 1 = 1.81265 | ν 1 = 25.4 |
| | r 2 = | 197.553 | d 2 = | 5.56 | | |
| | r 3 = | 244.561 | d 3 = | 10.45 | n 2 = 1.49845 | ν 2 = 81.5 |
| | r 4 = | −123.313 | d 4 = | 5.09 | | |
| aspherical surface | r 5 = | 186.700 | d 5 = | 8.25 | n 3 = 1.49845 | ν 3 = 81.5 |
| | r 6 = | −223.938 | d 6 = | 0.20 | | |
| | r 7 = | 97.053 | d 7 = | 8.50 | n 4 = 1.62286 | ν 4 = 60.3 |
| | r 8 = | 10246.315 | d 8 = | 0.20 | | |
| aspherical surface | r 9 = | 50.457 | d 9 = | 9.31 | n 5 = 1.62286 | ν 5 = 60.3 |
| | r10 = | 138.046 | d10 = variable | | | |
| | r11 = | 291.368 | d11 = | 0.80 | n 6 = 1.88815 | ν 6 = 40.8 |
| | r12 = | 16.177 | d12 = | 6.60 | | |
| | r13 = | −1315.056 | d13 = | 6.93 | n 7 = 1.81264 | ν 7 = 25.4 |
| | r14 = | −16.342 | d14 = | 0.80 | n 8 = 1.77621 | ν 8 = 49.6 |
| | r15 = | 25.169 | d15 = | 0.20 | | |
| | r16 = | 20.444 | d16 = | 6.04 | n 9 = 1.57047 | ν 9 = 42.8 |
| | r17 = | −61.211 | d17 = | 1.50 | | |
| | r18 = | −24.211 | d18 = | 0.80 | n10 = 1.74678 | ν10 = 49.3 |
| | r19 = | −57.128 | d19 = variable | | | |
| | r20 = | −28.241 | d20 = | 0.80 | n11 = 1.77621 | ν11 = 49.6 |
| | r21 = | 83.585 | d21 = | 2.36 | n12 = 1.85501 | ν12 = 23.9 |
| | r22 = | −207.605 | d22 = variable | | | |
| | r23 = | (stop) | d23 = | 1.40 | | |
| | r24 = | −5760.891 | d24 = | 3.01 | n13 = 1.51976 | ν13 = 52.4 |
| | r25 = | −59.636 | d25 = | 0.20 | | |
| | r26 = | 117.576 | d26 = | 3.00 | n14 = 1.65223 | ν14 = 33.8 |
| | r27 = | −99.997 | d27 = | 0.20 | | |
| | r28 = | 61.101 | d28 = | 6.55 | n15 = 1.51976 | ν15 = 52.4 |
| | r29 = | −28.796 | d29 = | 1.30 | n16 = 1.73234 | ν16 = 54.7 |
| | r30 = | −1741.609 | d30 = | 25.00 | | |
| | r31 = | 1590.884 | d31 = | 4.21 | n17 = 1.48915 | ν17 = 70.2 |
| | r32 = | −39.140 | d32 = | 0.20 | | |
| | r33 = | −506.290 | d33 = | 1.50 | n18 = 1.83932 | ν18 = 37.2 |
| | r34 = | 26.889 | d34 = | 6.08 | n19 = 1.48915 | ν19 = 70.2 |
| | r35 = | −113.555 | d35 = | 0.20 | | |
| | r36 = | 73.457 | d36 = | 4.94 | n20 = 1.48915 | ν20 = 70.2 |
| | r37 = | −41.482 | d37 = | 1.50 | n21 = 1.81265 | ν21 = 25.4 |
| | r38 = | −107.712 | d38 = | 0.20 | | |
| | r39 = | 28.325 | d39 = | 4.43 | n22 = 1.48915 | ν22 = 70.2 |
| | r40 = | 245.562 | d40 = | 4.40 | | |
| | r41 = | ∞ | d41 = | 30.00 | n23 = 1.60718 | ν23 = 38.0 |
| | r42 = | ∞ | d42 = | 16.20 | n24 = 1.51825 | ν24 = 64.2 |
| | r43 = | ∞ | | | | |

TABLE 3

| Variable | Focal length | | | | |
|---|---|---|---|---|---|
| spacing | 9.00 | 16.75 | 36.00 | 72.00 | 108.00 |
| d10 | 0.96 | 15.05 | 26.39 | 32.49 | 34.62 |
| d19 | 37.52 | 21.49 | 10.46 | 9.61 | 13.29 |
| d22 | 10.00 | 11.94 | 11.63 | 6.38 | 0.57 |

Aspherical Lens Shape
surface R9

| reference spherical surface R =50.457 | aspherical amount (R9) | h | Δ |
|---|---|---|---|
| aspherical coefficient k = $-3.622 \times D^{-3}$ | 70% 90% 100% | (23.06mm) (29.65mm) (32.94mm) | 40.9 μm 137.5 μm 241.4 μm |

TABLE 3-continued $B = -1.041 \times D^{-7}$  |Δ10/f1| = $4.390 \times 10^{-3}$
$C = -6.671 \times D^{-11}$  |Δ9/f1| = $2.499 \times 10^{-3}$
$D = 1.446 \times D^{-14}$  |Δ7/f1| = $7.432 \times 10^{-3}$
$E = -3.093 \times D^{-17}$ surface R11

| reference spherical surface R = 291.368 | Zoom parameter Fno. 1 = 0.866 |
|---|---|
| aspherical coefficient | β2w = −0.429 |
| $k = 9.963 \times D^{-4}$ | |ν1n−ν1p| = 45.5 |
| $B = 8.515 \times D^{-6}$ | hw/ht = 0.669 |
| $C = -1.308 \times D^{-8}$ | hw/hz = 0.786 |
| $D = 2.225 \times D^{-11}$ | |
| $E = -2.364 \times D^{-14}$ | |

(Numerical Value Embodiment 4)
f = 10.0 to 350.0   fno = 2.0 to 3.8   2w = 57.6° to 1.8°

| | | | | | |
|---|---|---|---|---|---|
| | r 1 = | −4936.075 | d 1 = | 2.50 n 1 = 1.83932 | ν 1 = 37.2 |
| | r 2 = | 162.964 | d 2 = | 1.53 | |
| | r 3 = | 185.106 | d 3 = | 12.11 n 2 = 1.43985 | ν 2 = 95.0 |
| | r 4 = | −336.653 | d 4 = | 0.25 | |
| aspherical surface | r 5 = | 116.937 | d 5 = | 15.29 n 3 = 1.49845 | ν 3 = 81.5 |
| | r 6 = | −377.042 | d 6 = | 0.25 | |
| | r 7 = | 103.823 | d 7 = | 8.18 n 4 = 1.48915 | ν 4 = 70.2 |
| | r 8 = | 268.086 | d 8 = variable | | |
| aspherical surface | r 9 = | 140.048 | d 9 = | 1.00 n 5 = 1.82017 | ν 5 = 46.6 |
| | r10 = | 19.197 | d10 = | 6.82 | |
| | r11 = | −124.220 | d11 = | 6.48 n 6 = 1.81264 | ν 6 = 25.4 |
| | r12 = | −18.406 | d12 = | 1.00 n 7 = 1.82017 | ν 7 = 46.6 |
| | r13 = | 79.566 | d13 = | 0.25 | |
| | r14 = | 30.350 | d14 = | 6.97 n 8 = 1.57047 | ν 8 = 42.8 |
| | r15 = | −42.567 | d15 = | 1.00 n 9 = 1.88815 | ν9 = 40.8 |
| | r16 = | 282.784 | d16 = variable | | |
| | r17 = | −44.889 | d17 = | 1.00 n10 = 1.80401 | ν10 = 42.2 |
| | r18 = | 57.767 | d18 = | 3.41 n11 = 1.93306 | ν11 = 21.3 |
| | r19 = | 957.007 | d19 = variable | | |
| | r20 = | 0.000 (stop) | d20 = | 1.30 | |
| | r21 = | 1384.436 | d21 = | 5.25 n12 = 1.62286 | ν12 = 60.3 |
| | r22 = | −51.145 | d22 = | 0.20 | |
| | r23 = | 110.714 | d23 = | 4.21 n13 = 1.52033 | ν13 = 58.9 |
| | r24 = | −161.931 | d24 = | 0.20 | |
| | r25 = | 43.436 | d25 = | 9.10 n14 = 1.48915 | ν14 = 70.2 |
| | r26 = | −61.248 | d26 = | 1.50 n15 = 1.83932 | ν15 = 37.2 |
| | r27 = | 91.884 | d27 = | 42.50 | |
| | r28 = | −9205.397 | d28 = | 4.94 n16 = 1.52033 | ν16 = 58.9 |
| | r29 = | −54.256 | d29 = | 0.70 | |
| | r30 = | 68.482 | d30 = | 1.50 n17 = 1.80401 | ν17 = 42.2 |
| | r31 = | 29.516 | d31 = | 6.45 n18 = 1.52032 | ν18 = 59.0 |
| | r32 = | 188.141 | d32 = | 0.33 | |
| | r33 = | 33.043 | d33 = | 7.87 n19 = 1.48915 | ν19 = 70.2 |
| | r34 = | −67.049 | d34 = | 1.50 n20 = 1.79012 | ν20 = 44.2 |
| | r35 = | 122.181 | d35 = | 3.87 | |
| | r36 = | −148.214 | d36 = | 2.04 n21 = 1.52033 | ν21 = 58.9 |
| | r37 = | −125.900 | d37 = | 5.50 | |
| | r38 = | 0.000 | d38 = | 37.50 n22 = 1.60718 | ν22 = 38.0 |
| | r39 = | 0.000 | d39 = | 20.25 n23 = 1.51825 | ν23 = 64.2 |
| | r40 = | 0.000 | | | |

TABLE 4

| Variable spacing | Focal length | | | | |
|---|---|---|---|---|---|
| | 10.00 | 24.32 | 60.00 | 184.00 | 350.00 |
| d 8 | 0.70 | 50.73 | 81.20 | 102.02 | 108.13 |
| d16 | 117.58 | 62.05 | 26.81 | 8.64 | 13.22 |
| d19 | 4.00 | 9.49 | 14.26 | 11.61 | 0.92 |

Aspherical Lens Shape
surface R1
reference spherical surface R = −4936.075   aspherical amount (R1)   h   Δ aspherical coefficient
k = 2.206 × $D^2$
B = −4.706 × $D^{-9}$
C = −7.537 × $D^{-13}$
D = −8.844 × $D^{-16}$
E = 2.191 × $D^{-9}$

| | 70% | (34.82mm) | 9.9 μm |
| | 90% | (44.77mm) | 33.1 μm |
| | 100% | (49.74mm) | 54.5 μm | aspherical amount (R7)   h   Δ

| | 70% | (31.46mm) | 50.8 μm |
| | 90% | (40.45mm) | 149.3 μm |
| | 100% | (44.94mm) | 239.9 μm | surface R7
  reference spherical surface R = 103.823
  aspherical coefficient
  k = −1.362 × $D^{-1}$
  B = −3.063 × $D^{-8}$
  C = −5.959 × $D^{-12}$
  D = 2.115 × $D^{-15}$
  E = −7.751 × $D^{-19}$ Zoom parameter
Fno.1 = 1.52
β2w = −0.182
|v1n−v1p| = 45.0
hw/ht = (R1)0.796,(R7)0.506
hw/hz = (R1)0.733,(R7)0.547 surface R1
|Δ10/f1| = 3.891 × $10^{-4}$
|Δ9/f1| = 2.364 × $10^{-4}$
|Δ7/f1| = 7.079 × $10^{-5}$
surface R7
|Δ10/f1| = 1.713 × $10^{-3}$
|Δ9/f1| = 1.067 × $10^{-3}$
|Δ7/f1| = 3.626 × $10^{-4}$ According to the present invention, as described above, there can be achieved a so-called four-unit zoom lens in which the lateral aberration of a focal length changing lens unit at the wide angle end, the F-number of a front lens unit, the lens arrangement of a variator, etc. are appropriately set and at least one aspherical surface is provided on at least one lens surface satisfying 0.95>hw/ht and 0.90>hw/hz, where ht is the maximum incidence height of an on-axis light beam in the front lens unit, hw is the maximum incidence height of an off-axis light beam of a maximum angle of view at the wide angle end, and hz is the maximum incidence height of an off-axis light beam of a maximum angle of view at a zoom position at a variable power ratio $Z^{1/4}$, whereby the spherical aberration near the telephoto end is reduced and further, by an aspherical surface being provided in the variator, the changing of distortion on the wide angle side is corrected and furthermore, the changing of astigmatism, coma and chromatic aberration resulting from a focal length change is well-balancedly corrected and which has high optical performance over an entire variable power range and has a large aperture, a wide angle and a high variable power ratio of F-number 1.7 or so at the wide angle end, a wide angle end angle of view 2ω=57°–70° and a variable power ratio 12–35.

What is claimed is:

1. A zoom lens comprising, in succession from the object side:

a first lens unit of positive refractive power fixed during focal length change;

a second lens unit of negative refractive power for focal length change;

a third lens unit for correcting changing of an image plane resulting from a focal length change; and a fixed fourth lens unit of positive refractive power, wherein in said first lens unit, an aspherical surface AS1 is applied onto at least one lens surface at a position satisfying 0.95>hw/ht and 0.90>hw/hz, wherein Z is the zoom ratio, ht is the maximum incidence height of an on-axis light beam, hw is the maximum incidence height of an off-axis light beam of a maximum angle of view at the wide angle end, and hz is the maximum incidence height of the off-axis light beam of the maximum angle of view at a zoom position at a variable power ratio $Z^{1/4}$, wherein said aspherical surface AS1, when applied onto a positive refracting surface, forms a shape in which positive refractive power becomes weaker toward the peripheral portion of the lens, and when provided on a negative refracting surface, forms a shape in which negative refractive power becomes stronger toward the peripheral portion of the lens, and wherein when the aspherical amounts of the aspherical surface AS1 at 100%, 90%, and 70% of the effective diameter of the lens are Δ10, Δ9, and Δ7, respectively, and the focal length of said first lens unit is f1, the following conditions are satisfied:

$3.7 \times 10^{-4} < |\Delta 10/f1| < 4.6 \times 10^{-3}$ $2.2 \times 10^{-4} < |\Delta 9/f1| < 3.0 \times 10^{-3}$ $6.7 \times 10^{-5} < |\Delta 7/f1| < 1.1 \times 10^{-3}.$ 2. A zoom lens according to claim 1, characterized in that when the focal length and F-number of the total system at the telephoto end are ft and Fno. t, respectively, and the focal length of said first lens unit is f1 and the F-number thereof is Fno. 1=f1/(ft/Fno. t), and the lateral magnification of said second lens unit at the wide angle end is β2w and the zoom ratio thereof is Z, the following conditional expressions are satisfied:

10<Z 0.8<Fno. 1<1.6

−0.45<β2w<−0.15.

3. A zoom lens according to claim 1, characterized in that said first lens unit is comprised, in succession from the object side, of at least one negative lens and at least three positive lenses, and when the Abbe number of said negative lens is v1n and the average value of the Abbe numbers of said three positive lenses is v1p, said first lens unit satisfies the following condition:

|v1n−v1p|>42.5.

4. A zoom lens according to claim 2, characterized in that said first lens unit is comprised, in succession from the object side, of at least one negative lens and at least three positive lenses, and when the Abbe number of said negative lens is v1n and the average value of the Abbe numbers of said three positive lenses is v1p, said first lens unit satisfies the following condition:

|v1n−v1p|>42.5.

5. The zoom lens according to claim 1, characterized in that at least one aspherical surface AS2 is provided in said second lens unit, and the aspherical surface AS2, when provided on a positive refracting surface, forms a shape in which positive refractive power becomes stronger toward the peripheral portion of the lens, and when provided on a negative refracting surface, forms a shape in which negative refractive power becomes weaker.

6. The zoom lens according to claim 2, characterized in that at least one aspherical surface AS2 is provided in said second lens unit, and the aspherical surface AS2, when provided on a positive refracting surface, forms a shape in which positive refractive power becomes stronger toward the peripheral portion of the lens, and when provided on a negative refracting surface, forms a shape in which negative refractive power becomes weaker.

7. The zoom lens according to claim 3, characterized in that at least one aspherical surface AS2 is provided in said second lens unit, and the aspherical surface AS2, when provided on a positive refracting surface, forms a shape in which positive refractive power becomes stronger toward the peripheral portion of the lens, and when provided on a negative refracting surface, forms a shape in which negative refractive power becomes weaker.

8. The zoom lens according to claim 4, characterized in that at least one aspherical surface AS2 is provided in said second lens unit, and the aspherical surface AS2, when provided on a positive refracting surface, forms a shape in which positive refractive power becomes stronger toward the peripheral portion of the lens, and when provided on a negative refracting surface, forms a shape in which negative refractive power becomes weaker.

* * * * *

UNITED STATES PATENT AND TRADEMARK OFFICE
CERTIFICATE OF CORRECTION

PATENT NO.    : 5,995,297
DATED         : November 30, 1999
INVENTOR(S)   : Fumiaki Usui It is certified that error appears in the above-identified patent and that said Letters Patent is hereby corrected as shown below:

Column 5,
Line 37, "an" should read -- a distortion --.
Line 38, "aberration" should be deleted.

Column 7,
Line 42, "correct well" should read -- corrected well --.

Column 9,
Line 51, "the same com-" should read -- a compensator --.
Line 52, "pensation" should be deleted.

Column 12,
Line 54, "corrects" should read -- correct --.

Column 16,
Line 31 (Numerical Value Embodiment 2), "aspherical" should be deleted.
Line 32 (Numerical Value Embodiment 2), "surface" should be deleted.
Line 41 (Numerical Value Embodiment 2), "r18" should read -- aspherical r18 surface --.

Signed and Sealed this

Second Day of October, 2001

Attest:

NICHOLAS P. GODICI
Attesting Officer    Acting Director of the United States Patent and Trademark Office